US012802655B2

(12) United States Patent
Kim et al.

(10) Patent No.: US 12,802,655 B2
(45) Date of Patent: Nov. 17, 2026

(54) DISPLAY DEVICE, DISPLAY PANEL, AND DISPLAY DRIVING METHOD

(71) Applicant: LG Display Co., Ltd., Seoul (KR)

(72) Inventors: Nakyoon Kim, Seoul (KR); ChangHoon Jeon, Gyeonggi-do (KR); Hongsoon Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 19/078,026

(22) Filed: Mar. 12, 2025

(65) Prior Publication Data

US 2025/0209998 A1 Jun. 26, 2025

Related U.S. Application Data

(63) Continuation of application No. 18/499,105, filed on Oct. 31, 2023, now Pat. No. 12,277,913, which is a (Continued)

(30) Foreign Application Priority Data

Nov. 10, 2021 (KR) ........................ 10-2021-0153851

(51) Int. Cl.
*G09G 3/30* (2006.01)
*G09G 3/20* (2006.01)
(Continued)

(52) U.S. Cl.
CPC ......... *G09G 3/3291* (2013.01); *G09G 3/2096* (2013.01); *G09G 3/3233* (2013.01); (Continued)

(58) Field of Classification Search
CPC .. G09G 3/3208; G09G 3/3225; G09G 3/3648; G09G 2310/0262
See application file for complete search history.

(56) References Cited

U.S. PATENT DOCUMENTS

2016/0203794 A1 7/2016 Lim et al.
2018/0061311 A1 3/2018 Lin et al.
(Continued)

*Primary Examiner* — Sanghyuk Park
(74) *Attorney, Agent, or Firm* — Seed Intellectual Property Law Group LLP

(57) ABSTRACT

The present disclosure relates to display device, display panel, and display driving method. Disclosed herein is a display device including a display panel in which a light emitting element, a driving transistor configured to provide a driving current to a light emitting element using a driving voltage, and a plurality of switching transistors configured to control driving of the driving transistor are disposed; a gate driving circuit configured to supply a plurality of scan signals to the display panel through a plurality of gate lines; an emission driving circuit configured to supply a plurality of emission signals to the display panel through a plurality of emission signal lines; a data driving circuit configured to supply a data voltage to the display panel; and a timing controller configured to, in a low speed mode in which the display panel is operated at a low driving frequency, control the driving current to be applied to the driving transistor during a first emission control period after a bias voltage is applied to the driving transistor, and control the driving current to be applied to the light emitting element through the driving transistor during a second emission control period.

15 Claims, 13 Drawing Sheets

Related U.S. Application Data continuation of application No. 17/975,512, filed on Oct. 27, 2022, now Pat. No. 11,830,443.

(51) Int. Cl.
*G09G 3/3233* (2016.01)
*G09G 3/3291* (2016.01)

(52) U.S. Cl.
CPC ............... *G09G 2300/0426* (2013.01); *G09G 2300/0842* (2013.01); *G09G 2310/08* (2013.01); *G09G 2320/0247* (2013.01); *G09G 2320/0257* (2013.01)

(56) References Cited

U.S. PATENT DOCUMENTS

| | | | | |
|---|---|---|---|---|
| 2019/0057646 | A1 | 2/2019 | Lin et al. | |
| 2020/0243012 | A1 | 7/2020 | Jin et al. | |
| 2021/0193049 | A1 | 6/2021 | Lin et al. | |
| 2021/0225264 | A1 | 7/2021 | Xuan et al. | |
| 2021/0225282 | A1* | 7/2021 | Cho | G09G 3/3233 |
| 2021/0256908 | A1* | 8/2021 | Park | G09G 3/3266 |
| 2021/0366397 | A1 | 11/2021 | Na | |
| 2021/0383752 | A1 | 12/2021 | Yang | |
| 2022/0028333 | A1 | 1/2022 | Jeong et al. | |
| 2022/0284860 | A1 | 9/2022 | Lin et al. | |

* cited by examiner

P1

DISPLAY DEVICE, DISPLAY PANEL, AND DISPLAY DRIVING METHOD

CROSS REFERENCE TO RELATED APPLICATION

This application claims priority from Korean Patent Application No. 10-2021-0153851, filed on Nov. 10, 2021, which is hereby incorporated by reference for all purposes as if fully set forth herein.

BACKGROUND

Technical Field

The present disclosure relates to a display device, a display panel, and a display driving method, and more particularly, to a display device, a display panel, and a display driving method which are capable of reducing defects of image quality due to voltage fluctuations of light emitting elements during an operation process at a low driving frequency.

Description of the Related Art

As the information society develops, various demands for display devices which display images are increasing, and various types of display devices such as liquid crystal display (LCD) devices and organic light emitting display devices are being utilized.

Among these display devices, an organic light emitting diode (OLED) device employs an organic light emitting diode which emits light by itself and thus has advantages of a fast response speed, a contrast ratio, emission efficiency, luminance, and a viewing angle.

An OLED device includes an organic light emitting diode disposed on each of a plurality of sub-pixels disposed on a display panel and controls a current flowing in the organic light emitting diode to allow the organic light emitting diode to emit light so that the OLED device may control luminance of each sub-pixel to display an image.

In this case, image data supplied to the display device may be a still image or a moving image which is varied at a predetermined speed, and the moving image may correspond to various types of images such as sports images, movies, and game images.

In addition, the display device may be switched to various driving modes according to an input of a user or an operation state.

Meanwhile, the display device can change a driving frequency according to a type of input image data or a driving mode.

BRIEF SUMMARY

The inventors have realized that, during operation at a low driving frequency, there is a problem in that degradation of image quality such as black excitation occurs due to voltage fluctuation of a light emitting element.

Accordingly, the inventors of the present disclosure have invented a display device, a display panel, and a display driving method which are capable of reducing defects of image quality occurring during operation at a low driving frequency.

An aspect of the present disclosure is to provide a display device, a display panel, and a display driving method which are capable of reducing defects of image quality such as black excitation by stably maintaining a voltage of a light emitting element in a time section operating at a low driving frequency.

Another aspect of the present disclosure is to provide a display device, a display panel, and a display driving method which are capable of reducing defects of image quality such as black excitation through timing control in which an emission signal is applied in a time section operating at a low driving frequency.

The problems to be solved by the present disclosure, which will be described below, are not limited to the above-described problems, and other problems that are not described can be clearly understood by those skilled in the art from the following description.

In an aspect, embodiments of the present disclosure may provide a display device capable of operating in a low speed mode at a low driving frequency and a high speed mode at a high driving frequency including a display panel in which a light emitting element, a driving transistor configured to provide a driving current to the light emitting element using a driving voltage, and a plurality of switching transistors configured to control driving of the driving transistor are disposed; a gate driving circuit configured to supply a plurality of scan signals to the display panel through a plurality of gate lines; an emission driving circuit configured to supply a plurality of emission signals to the display panel through a plurality of emission signal lines; a data driving circuit configured to supply a data voltage to the display panel; and a timing controller configured to, in the low speed mode in which the display panel is operated at the low driving frequency, control the driving current to be applied to the driving transistor during a first emission control period after a bias voltage is applied to the driving transistor and control the driving current to be applied to the light emitting element through the driving transistor during a second emission control period.

In the display device, the plurality of switching transistors may include a first switching transistor having a gate electrode to which a first scan signal is applied, a drain electrode connected to a gate electrode of the driving transistor and a storage capacitor, and a source electrode connected to a source electrode of the driving transistor; a second switching transistor having a gate electrode to which a second scan signal is applied, a drain electrode to which a data voltage is applied, and a source electrode connected to a drain electrode of the driving transistor; a third switching transistor having a gate electrode to which a first emission signal is applied, a drain electrode to which a driving voltage is applied, and a source electrode connected to the drain electrode of the driving transistor; a fourth switching transistor having a gate electrode to which a second emission signal is applied, a drain electrode connected to the source electrode of the driving transistor, and a source electrode connected to the anode electrode of the light emitting element; a fifth switching transistor having a gate electrode to which a third scan signal is applied, a drain electrode to which the bias voltage is supplied, and a source electrode connected to the source electrode of the driving transistor; and a sixth switching transistor having a gate electrode to which a fourth scan signal is applied, a drain electrode to which a reset voltage is supplied, and a source electrode connected to the anode electrode of the light emitting element.

In the display device, the first emission control period may correspond to a time section in which the third switching transistor is turned on by the first emission signal in a state in which the fourth switching transistor is turned off.

In the display device, the first emission control period may correspond to a time section in which a voltage of the source electrode of the driving transistor is lowered from a level of the bias voltage to a level of the driving voltage.

In the display device, the second emission control period may correspond to a time section in which the fourth switching transistor is turned on by the second emission signal in a state in which the third switching transistor is turned on.

In the display device, the third and fourth switching transistors are an $n^{th}$ third switching transistor and an $n^{th}$ fourth switching transistors in an $n^{th}$ sub-pixel, respectively, wherein n is a natural number, the second emission signal may correspond to a signal applied to the gate electrode of the fourth switching transistor through an $n^{th}$ emission signal line, and the first emission signal may correspond to a signal applied to the gate electrode of the third switching transistor through an $(n-X)^{th}$ emission signal line, wherein X is a natural number less than n.

In the display device, the fifth switching transistor is an $n^{th}$ fifth switching transistor in an $n^{th}$ sub-pixel, wherein n is a natural number, the third scan signal may correspond to a signal applied to the gate electrode of the fifth switching transistor through an $n^{th}$ gate line, and the fourth scan signal may also correspond to a signal applied to a gate electrode of an $(n+1)^{th}$ fifth switching transistor in an $(n+1)^{th}$ sub-pixel through an $(n+1)^{th}$ gate line.

In the display device, the bias voltage may be applied at a higher level than the driving voltage.

In the display device, the low speed mode may include a refresh frame period in which a data voltage for driving the light emitting element is applied, and a skip frame period in which the data voltage is not applied.

A method of driving a display panel in which a light emitting element, a driving transistor configured to provide a driving current to the light emitting element using a driving voltage, and a plurality of switching transistors configured to control driving of the driving transistor are disposed, includes switching a first mode of a high driving frequency to a second mode of a low driving frequency, applying a bias voltage to a source electrode of the driving transistor, applying the driving voltage to the driving transistor in response to a first emission signal during a first emission control period, applying a reset voltage to an anode electrode of the light emitting element during the first emission control period, and supplying the driving current to the light emitting element in response to a second emission signal during a second emission control period later than the first emission control period.

A display panel capable of operating in a low speed mode at a low driving frequency and a high speed mode at a high driving frequency includes a light emitting element; a driving transistor configured to provide a driving current to the light emitting element using a driving voltage; a first switching transistor having a gate electrode to which a first scan signal is applied, a drain electrode connected to a gate electrode of the driving transistor and a storage capacitor, and a source electrode connected to a source electrode of the driving transistor; a second switching transistor having a gate electrode to which a second scan signal is applied, a drain electrode to which a data voltage is applied, and a source electrode connected to a drain electrode of the driving transistor; a third switching transistor having a gate electrode to which a first emission signal is applied, a drain electrode to which a driving voltage is applied, and a source electrode connected to the drain electrode of the driving transistor; a fourth switching transistor having a gate electrode to which a second emission signal is applied, a drain electrode connected to the source electrode of the driving transistor, and a source electrode connected to the anode electrode of the light emitting element; a fifth switching transistor having a gate electrode to which a third scan signal is applied, a drain electrode to which the bias voltage is supplied, and a source electrode connected to the source electrode of the driving transistor; and a sixth switching transistor having a gate electrode to which a fourth scan signal is applied, a drain electrode to which a reset voltage is supplied, and a source electrode connected to the anode electrode of the light emitting element, wherein, in the low speed mode operating at the low driving frequency, the driving current is applied to the driving transistor during a first emission control period after a bias voltage is applied to the driving transistor, and the driving current is applied to the light emitting element through the driving transistor during a second emission control period.

In the display panel, the first emission control period may be a time section in which the third switching transistor is turned on by the first emission signal in a state in which the fourth switching transistor is turned off, and the second emission control period may be a time section in which the fourth switching transistor is turned on by the second emission signal in a state in which the third switching transistor is turned on.

According to embodiments of the present disclosure, it may provide a display device, a display panel, and a display driving method which are capable of reducing defects of image quality occurring during operation at a low driving frequency.

According to embodiments of the present disclosure, it may provide a display device, a display panel, and a display driving method which are capable of reducing defects of image quality such as black excitation by stably maintaining a voltage of a light emitting element in a time section operating at a low driving frequency.

According to embodiments of the present disclosure, it may provide a display device, a display panel, and a display driving method which are capable of reducing defects of image quality such as black excitation through timing control in which an emission signal is applied in a time section operating at a low driving frequency.

The effects of the embodiments disclosed in the present disclosure are not limited to the above-mentioned effects. In addition, the embodiments disclosed in the present disclosure may generate other effects not mentioned above, which will be clearly understood by those skilled in the art from the following description.

BRIEF DESCRIPTION OF THE SEVERAL VIEWS OF THE DRAWINGS

The above and other aspects, features and advantages of the present disclosure will be more apparent from the following detailed description taken in conjunction with the accompanying drawings, in which.

DETAILED DESCRIPTION

Figure 1:
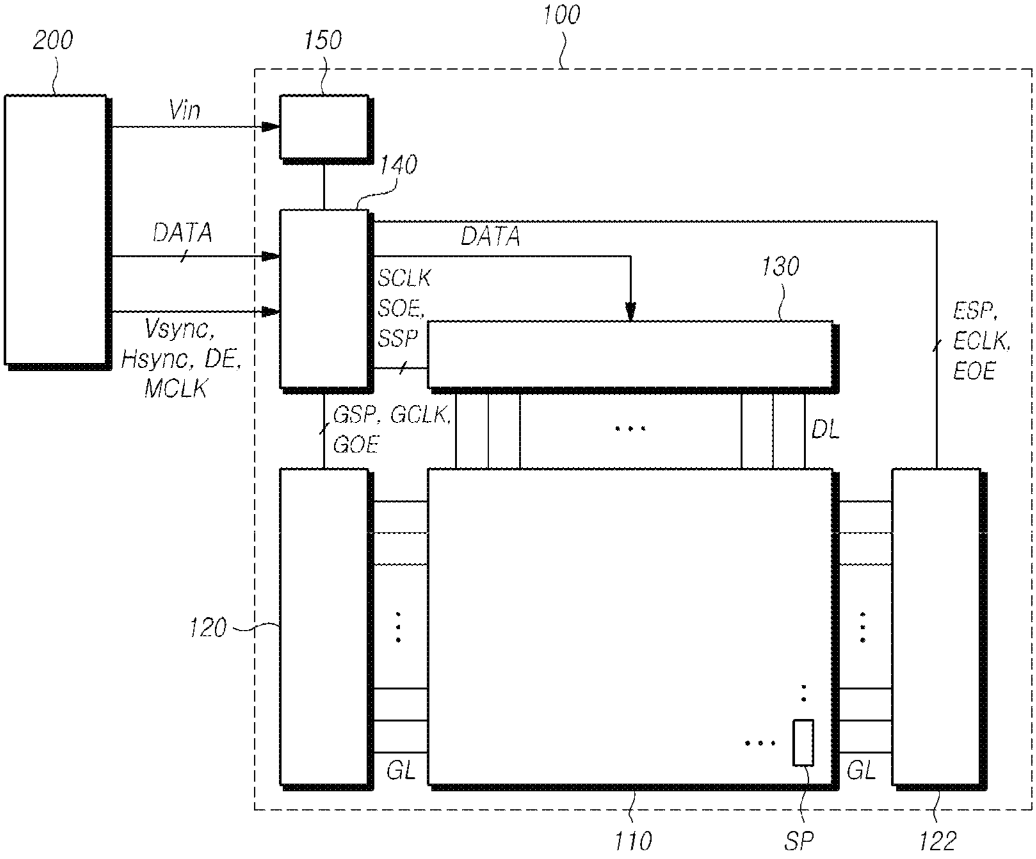
FIG. 1 is a diagram illustrating a schematic configuration of a display device according to one embodiment of the present disclosure.

The advantages and features of the present disclosure and methods of the realization thereof will be apparent with reference to the accompanying drawings and detailed descriptions of the embodiments. The present disclosure should not be construed as being limited to the embodiments set forth herein and may be embodied in a variety of different forms. Rather, these embodiments are provided so that the present disclosure will be thorough and complete, and will fully convey the scope of the present disclosure to those having ordinary knowledge in the technical field.

The shapes, sizes, ratios, angles, numbers, and the like, inscribed in the drawings to illustrate example embodiments are illustrative only, and the present disclosure is not limited to the embodiments illustrated in the drawings. Throughout this document, the same reference numerals and symbols will be used to designate the same or like components. In the following description of the present disclosure, detailed descriptions of known functions and components incorporated into the present disclosure will be omitted in the situation in which the subject matter of the present disclosure may be rendered unclear thereby. It will be understood that the terms “comprise,” “include,” “have,” and any variations thereof used herein are intended to cover non-exclusive inclusions unless explicitly described to the contrary. Descriptions of components in the singular form used herein are intended to include descriptions of components in the plural form, unless explicitly described to the contrary.

In the analysis of a component, it shall be understood that an error range is included therein, even in the situation in which there is no explicit description thereof.

When spatially relative terms, such as “on,” “above,” “under,” “below,” and “on a side of,” are used herein for descriptions of relationships between one element or component and another element or component, one or more intervening elements or components may be present between the one and other elements or components, unless a term, such as “directly,” is used.

When temporally relative terms, such as “after,” “subsequent,” “following,” and “before” are used to describe a temporal relationship, a non-continuous case may be included unless the term “immediately” or “directly” is used.

In descriptions of signal transmission, such as “a signal is sent from node A to node B,” a signal may be sent from node A to node B via another node unless the term “immediately” or “directly” is used.

In addition, terms, such as “first” and “second” may be used herein to describe a variety of components. It should be understood, however, that these components are not limited by these terms. These terms are merely used to discriminate one element or component from other elements or components. Thus, a first component referred to as first hereinafter may be a second component within the spirit of the present disclosure.

The features of example embodiments of the present disclosure may be partially or entirely coupled or combined with each other and may work in concert with each other or may operate in a variety of technical methods. In addition, respective example embodiments may be carried out independently or may be associated with and carried out in concert with other embodiments.

Hereinafter, a variety of embodiments will be described in detail with reference to the accompanying drawings.

FIG. 1 is a diagram illustrating a schematic configuration of a display device according to one embodiment of the present disclosure.

Referring to FIG. 1, a display device 100 according to one embodiment of the present disclosure may include a display panel 110 with which a plurality of gate lines GL and a plurality of data lines DL are connected and in which a plurality of sub-pixels SP are disposed in the form of a matrix, a gate driving circuit 120 for driving the plurality of gate lines GL, an emission driving circuit 122 for driving a plurality of emission signal lines EL, a data driving circuit 130 for supplying data voltages through the plurality of data lines DL, a timing controller 140 for controlling the gate driving circuit 120 and the data driving circuit 130, and a power management integrated circuit (IC) 150.

The display panel 110 displays an image based on scan signals transmitted from the gate driving circuit 120 through the plurality of gate lines GL and data voltages transmitted from the data driving circuit 130 through the plurality of data lines DL.

In the case of a liquid crystal display (LCD) device, the display panel 110 includes a liquid crystal layer formed between two substrates and may operate in any known mode such as a twisted nematic (TN) mode, a vertical alignment (VA) mode, an in plane switching (IPS) mode, or a fringe field switching (FFS) mode. Meanwhile, in the case of the organic light emitting display device, the display panel 110 may be implemented in a top emission method, a bottom emission method, or a dual emission method.

In the display panel 110, a plurality of pixels may be disposed in the form of a matrix, each pixel may be formed of sub-pixels SP having different colors, for example, a white sub-pixel, a red sub-pixel, a green sub-pixel, and a blue sub-pixel, and each sub-pixel SP may be located at regions of overlap of the plurality of data lines DL and the plurality of gate lines GL.

One sub-pixel SP may be formed in a region where the data line DL and the gate line GL overlap and may include a plurality of thin film transistors (TFTs) for driving the sub-pixels SP, a light emitting element such as an organic light emitting diode (OLED) for charging a data voltage, and a storage capacitor electrically connected to the light emitting element and configured to maintain a voltage.

For example, when the display device 100 having a resolution of 2,160×3,840 is formed of four sub-pixels SP of a white (W) sub-pixel, a red (R) sub-pixel, a green (G) sub-pixel, and a blue (B) sub-pixel, due to 2,160 gate lines GL and 3,840 data lines DL connected to each of four sub-pixels (WRGB), all data lines DL of 3,840×4=15,360 may be provided, and sub-pixels SP may be disposed at regions of overlap of the gate lines GL and the data lines DL.

The gate driving circuit 120 is controlled by the timing controller 140 and sequentially outputs scan signals to the plurality of gate lines GL disposed in the display panel 110 to control driving timings of the plurality of sub-pixels SP.

In the display device 100 having a resolution of 2,160×3,840, a case in which scan signals are sequentially output from the first gate line to the 2,160$^{th}$ gate lines with respect to 2,160 gate lines GL may be referred to as 2,160-phase driving. Alternatively, as in the case of sequentially outputting scan signals from the first gate line to the fourth gate line and then sequentially outputting the scan signals from the fifth gate line to the eighth gate line, a case in which a scan signal is sequentially output in units of four gate lines GL may be referred to as four-phase driving. That is, a case in which a scan signal is sequentially output for every N gate lines GL may be referred to as N-phase driving.

In this case, the gate driving circuit 120 may include one or more gate driving integrated circuits GDIC, and according to a driving method, the gate driving circuit 120 may be located on only one side or both sides of the display panel 110. Alternatively, the gate driving circuit 120 may be embedded in a bezel area of the display panel 110 to be implemented in the form of a gate in panel (GIP).

Here, an example in which the gate driving circuit 120 is located on a left side of the display panel 110 and the emission driving circuit 122 is located on a right side of the display panel 110 is shown, but the gate driving circuit 120 and the emission driving circuit 122 may be located at the same position.

The emission driving circuit 122 outputs an emission signal EM under the control of the timing controller 140 and supplies the emission signal EM to the display panel 110 through emission signal lines EL.

The emission driving circuit 122 may sequentially supply the emission signal EM to the emission signal lines EL by shifting the emission signal EM using a shift register. In this case, the emission driving circuit 122 repeatedly toggles the emission signal EM during an image driving period under the control of the timing controller 140 to drive the display panel 110 at a predetermined or selected duty ratio, for example, a duty ratio of 50%.

In this case, the emission driving circuit 122 may include one or more emission control circuits ECC, and according to a driving method, the gate driving circuit 120 may be located on only one side or both sides of the display panel 110. The emission driving circuit 122 may be directly formed on a substrate of the display panel 110 together with the gate driving circuit 120 by a GIP process.

One frame period may be divided into a write time section in which a data voltage is applied to each sub-pixel SP and is recorded, and an emission time section in which the sub-pixel SP emits light at a predetermined or selected duty ratio according to the emission signal EM after the write time section. Generally, the emission signal EM allows the sub-pixel SP to emit light at a duty ratio of 50% or less during the emission time section. Since the write time section is only approximately one horizontal period 1H, most of one frame period corresponds to the emission time section.

The sub-pixel SP charges the data voltage in the storage capacitor during the write time section, and the sub-pixel SP is repeatedly turned on and off according to the emission signal EM. That is, the sub-pixel SP is repeatedly turned on and off within one frame period to emit light at a duty ratio of 50% or less, thereby repeatedly turning on/off.

As described above, the sub-pixel SP emits light after being turned off due to the voltage charged at the storage capacitor so that, during one frame period, after the write time section, the sub-pixel SP may display data with the same luminance during one frame period at a duty ratio of 50% or less without receiving an additional data voltage.

The data driving circuit 130 receives image data DATA from the timing controller 140 and converts the received image data DATA into an analog data voltage. Then, the data voltage is output to each data line DL according to a timing when the scan signal is applied through the gate line GL, and each sub-pixel SP connected to the data line DL displays an emission signal having a luminance corresponding to the data voltage according to a timing when the emission signal EM is applied.

Similarly, the data driving circuit 130 may include one or more source driving integrated circuits SDIC, and the source driving integrated circuits SDIC may be connected to a bonding pad of the display panel 110 or may be directly disposed on the display panel 110 using a tape automated bonding (TAB) method or a chip on glass (COG) method.

In some cases, each source driving integrated circuit SDIC may be integrated and disposed on the display panel 110. In addition, each source driving integrated circuit SDIC may be implemented in a chip on film (COF) method. In this case, each source driving integrated circuit SDIC may be mounted on a circuit film and may be electrically connected to the data lines DL of the display panel 110 through the circuit film.

The timing controller 140 supplies various control signals to the gate driving circuit 120, the emission driving circuit 122, and the data driving circuit 130 and controls operations of the gate driving circuit 120, the emission driving circuit 122, and the data driving circuit 130. That is, the timing controller 140 controls an output of the scan signal of the gate driving circuit 120 and an output of the emission signal EM of the emission driving circuit 122 according to a timing implemented in each frame. On the other hand, the timing controller 140 transmits the image data DATA received from a host system 200 to the data driving circuit 130.

In this case, in addition to the image data DATA, the timing controller 140 receives various timing signals including a vertical synchronization signal Vsync, a horizontal synchronization signal Hsync, a data enable signal DE, and a main clock MCLK from an external host system 200.

The host system 200 may be any one among a television (TV) system, a set-top box, a navigation system, a personal computer (PC), a home theater system, a mobile device, and a wearable device system.

Accordingly, the timing controller 140 generates control signals using the various timing signals received from the host system 200 and transmits the control signals to the gate driving circuit 120, the emission driving circuit 122, and the data driving circuit 130.

For example, in order to control the gate driving circuit 120, the timing controller 140 outputs various gate control signals including a gate start pulse GSP, a gate clock GCLK, and a gate output enable signal GOE. Here, the gate start pulse GSP controls timings at which one or more gate driving integrated circuits GDIC constituting the gate driving circuit 120 begin to operate. In addition, the gate clock GCLK is a clock signal, which is commonly input to the one or more gate driving integrated circuits GDIC, and controls a shift timing of the scan signal. In addition, the gate output enable signal GOE specifies timing information of the one or more gate driving integrated circuits GDIC.

In addition, in order to control the emission driving circuit 122, the timing controller 140 outputs various emission signals including an emission start pulse ESP, an emission clock ECLK, and an emission output enable signal EOE. Here, the emission start pulse ESP controls timings at which one or more emission control circuits ECC constituting the emission driving circuit 122 begin to operate. In addition, the emission clock ECLK is a clock signal, which is commonly input to the one or more emission control circuits ECC, and controls a shift timing of the emission signal. In addition, the emission output enable signal EOE specifies timing information of the one or more emission control circuits ECC.

In addition, in order to control the data driving circuit 130, the timing controller 140 outputs various data control signals including a source start pulse SSP, a source sampling clock SCLK, and a source output enable signal SOE. Here, the source start pulse SSP controls timings at which one or more source driving integrated circuits SDIC constituting the data driving circuit 130 begin to operate. The source sampling clock SCLK is a clock signal which controls a timing of data sampling in the source driving integrated circuit SDIC. The source output enable signal SOE controls an output timing of the data driving circuit 130.

The display device 100 may include a power management integrated circuit (PMIC) 150 which supplies various voltages or currents to the display panel 110, the gate driving circuit 120, the emission driving circuit 122, and the data driving circuit 130 or controls various voltages or currents to be supplied thereto.

The PMIC 150 controls a direct-current (DC) input voltage Vin supplied from the host system 200 to generate power beneficial for driving the display panel 110, the gate driving circuit 120, the emission driving circuit 122, and the data driving circuit 130.

Meanwhile, the sub-pixels SP may be located at a position where the gate lines GL and the data lines DL overlap, and a light emitting element may be disposed at each sub-pixel SP. For example, an organic light emitting display device may include a light emitting element such as an OLED at each sub-pixel SP and display an image by controlling a current flowing in the light emitting element according to a data voltage.

The display device 100 may be any of various types of devices such as an LCD device, an organic light emitting display device, and a plasma display device.

Figure 2:
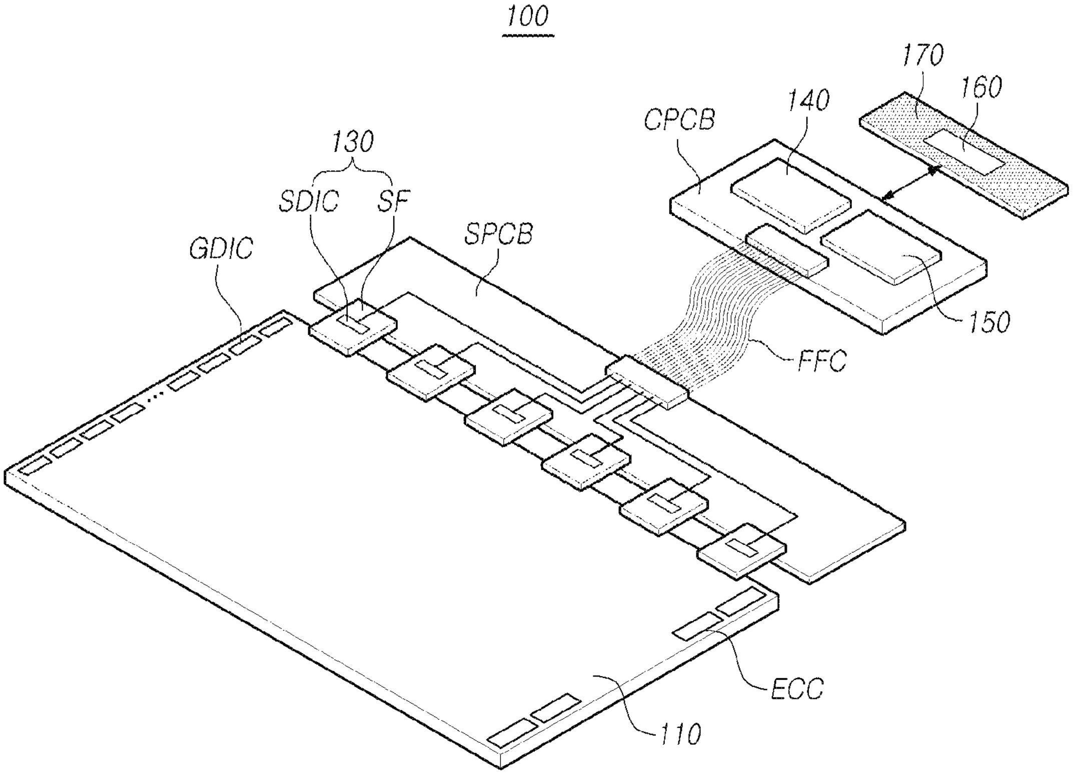
FIG. 2 is an example diagram illustrating a system of the display device according to one embodiment of the present disclosure.

FIG. 2 is an example diagram illustrating a system of the display device according to one embodiment of the present disclosure.

FIG. 2 shows the display device 100 according to embodiments of the present disclosure in which the source driving integrated circuits SDIC included in the data driving circuit 130 are implemented using a COF method among various methods (TAB, COG, and COF) and the gate driving circuit 120 and the emission driving circuit 122 are implemented in the form of a GIP among various methods (TAB, COG, COF, and GIP).

When the gate driving circuit 120 is implemented in the form of a GIP, the plurality of gate driving integrated circuits GDIC included in the gate driving circuit 120 may be directly formed in the bezel area of the display panel 110. In this case, the gate driving integrated circuit GDIC may receive various signals (a clock signal, a gate high signal, and a gate low signal) beneficial for generating a scan signal through a gate driving related signal line disposed in the bezel area.

In addition, when the emission driving circuit 122 is implemented in the form of a GIP, the plurality of emission control circuits ECC included in the emission driving circuit 122 may be directly formed in the bezel area of the display panel 110. In this case, the emission control circuit ECC may receive various signals (a clock signal and an emission driving signal) beneficial for generating an emission signal through an emission driving related signal line disposed in the bezel area.

Similarly, the one or more source driving integrated circuits SDIC included in the data driving circuit 130 may each be mounted on a source film SF, and one side of the source film SF may be electrically connected to the display panel 110. In addition, lines for electrically connecting the source driving integrated circuit SDIC to the display panel 110 may be disposed above the source film SF.

The display device 100 may include at least one source printed circuit board SPCB configured to circuit-connect the plurality of source driving integrated circuits SDIC to other devices, and a control printed circuit board CPCB configured to mount control components and various electric devices thereon.

In this case, the other side of the source film SF on which the source driving integrated circuit SDIC is mounted may be connected to the at least one source printed circuit board SPCB. That is, one side of the source film SF on which the source driving integrated circuit SDIC is mounted may be electrically connected to the display panel 110, and the other side of the source film SF may be electrically connected to the source printed circuit board SPCB.

The timing controller 140 and the PMIC 150 may be mounted on the control printed circuit board CPCB. The timing controller 140 may control operations of the data driving circuit 130, the gate driving circuit 120, and the emission driving circuit 122. The PMIC 150 may supply a driving voltage or current to the display panel 110, the data driving circuit 130, the gate driving circuit 120, and the emission driving circuit 122 and control a driving voltage or current to be supplied.

The at least one source printed circuit board SPCB and the control printed circuit board CPCB may be circuit-connected through at least one connection member, and the connection member may be formed as, for example, a flexible printed circuit FPC, a flexible flat cable FFC, or the like. In addition, the at least one source printed circuit board SPCB and the control printed circuit board CPCB may be integrated into one printed circuit board.

The display device 100 may further include a set board 170 electrically connected to the control printed circuit board CPCB. In this case, the set board 170 may be referred to as a power board. A main power management circuit (M-PMC) 160 configured to manage the total power of the display device 100 may be present in the set board 170. The M-PMC 160 may be interlocked with the PMIC 150.

In the case of the display device 100 having the above configuration, the driving voltage is generated from the set board 170 and transmitted to the PMIC 150 in the control printed circuit board CPCB. The PMIC 150 transmits a driving voltage beneficial for driving a display or sensing a characteristic value to the source printed circuit board SPCB through the flexible printed circuit FPC or the flexible flat cable FFC. The driving voltage transmitted to the source printed circuit board SPCB is supplied through the source driving integrated circuit SDIC to allow a specific sub-pixel SP in the display panel 110 to emit light or detect the specific sub-pixel SP.

In this case, each sub-pixel SP disposed in the display panel 110 of the display device 100 may be configured as a light emitting element and a circuit element such as a driving transistor for driving the light emitting element.

The type and number of circuit elements constituting each sub-pixel SP may be variously determined according to a provided function and a design method.

Figure 3:
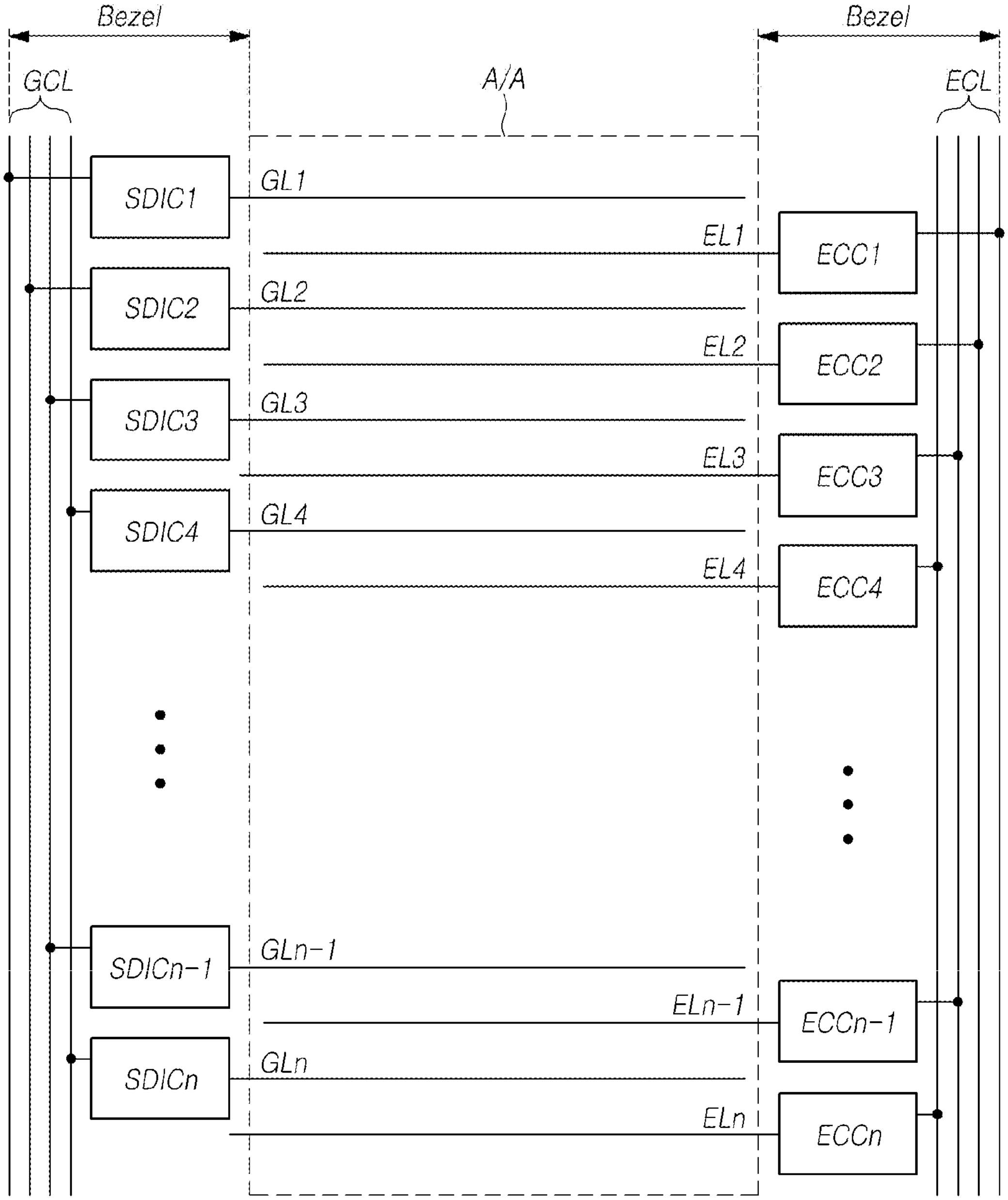
FIG. 3 is a diagram illustrating an example of a display panel in which a gate driving circuit and an emission driving circuit are implemented in a gate in panel (GIP) type in the display device according to one embodiment of the present disclosure.

FIG. 3 is a diagram illustrating an example of a display panel in which a gate driving circuit and an emission driving circuit are implemented in a GIP type in the display device according to one embodiment of the present disclosure.

Referring to FIG. 3, the display device 100 according to one embodiment of the present disclosure includes n gate lines GL1 to GLn (n is a natural number) and n emission signal lines EL1 to ELn (n is a natural number), and the n gate lines GL1 to GLn and n emission signal lines EL1 to ELn may be disposed in an active area A/A for displaying an image.

Here, the active area A/A is an area for displaying an image in which the plurality of sub-pixels SP for emitting light of a corresponding color, for example, a W sub-pixel, an R sub-pixel, a G sub-pixel, and a B sub-pixel, are disposed. In addition, a plurality of dummy pixels, which do not emit light because the scan signal SCAN or the data voltage Vdata is not applied but each of which has a load similar to that of the sub-pixel SP, may be located in some positions of the active area A/A.

In the embodiments of the present disclosure, a plurality of sub-pixel areas emitting light of a corresponding color and an area in which dummy pixels not emitting light are disposed are referred to as the active area A/A. Alternatively, the plurality of sub-pixel regions emitting light of a corresponding color and the area in which the dummy pixels not emitting light are disposed may be referred to as a pixel array.

The gate driving circuit 120 is disposed and embedded in a bezel area on one side of the active area A/A, in which pixels are not formed, and may include n source driving integrated circuits SDIC1 to SDICn corresponding to n gate lines GL1 to GLn.

Accordingly, the n source driving integrated circuits SDIC1 to SDICn may output scan signals SCAN to the n gate lines GL1 to GLn.

In addition, the emission driving circuit 122 is disposed and embedded in the bezel area on the other side of the active area A/A, in which the pixels are not formed, and may include n emission control circuits ECC1 to ECCn corresponding to n emission signal lines EL1 to ELn.

Accordingly, the n emission control circuits ECC1 to ECCn may output emission signals EM to the n emission signal lines EL1 to ELn.

In this way, when the gate driving circuit 120 and the emission driving circuit 122 are each implemented in a GIP type, since there is no need to manufacture a separate integrated circuit having a gate driving function or an emission driving function and to bond the separate integrated circuit to the display panel 110, the number of integrated circuits may be reduced and a process of connecting the integrated circuit to the display panel 110 may be omitted. In addition, a size of the bezel area in which the integrated circuit is bonded in the display panel 110 may be reduced.

Alternatively, the n source driving integrated circuits SDIC1 to SDICn and the n emission control circuits ECC1 to ECCn may be disposed together in the bezel area on one side of the display panel 110.

A plurality of gate clock lines GCL for transmitting the gate clock GCLK, which is beneficial for generating and outputting the scan signal SCAN, to the gate driving circuit 120 may be disposed in the bezel area on one side of the active area A/A, in which the pixels are not formed.

In addition, a plurality of emission clock lines ECL for transmitting the emission clock ECLK, which is beneficial for generating and outputting the emission signal EM, to the emission driving circuit 122 may be disposed in the bezel area on the other side of the active area A/A, in which pixels are not formed.

Figure 4:
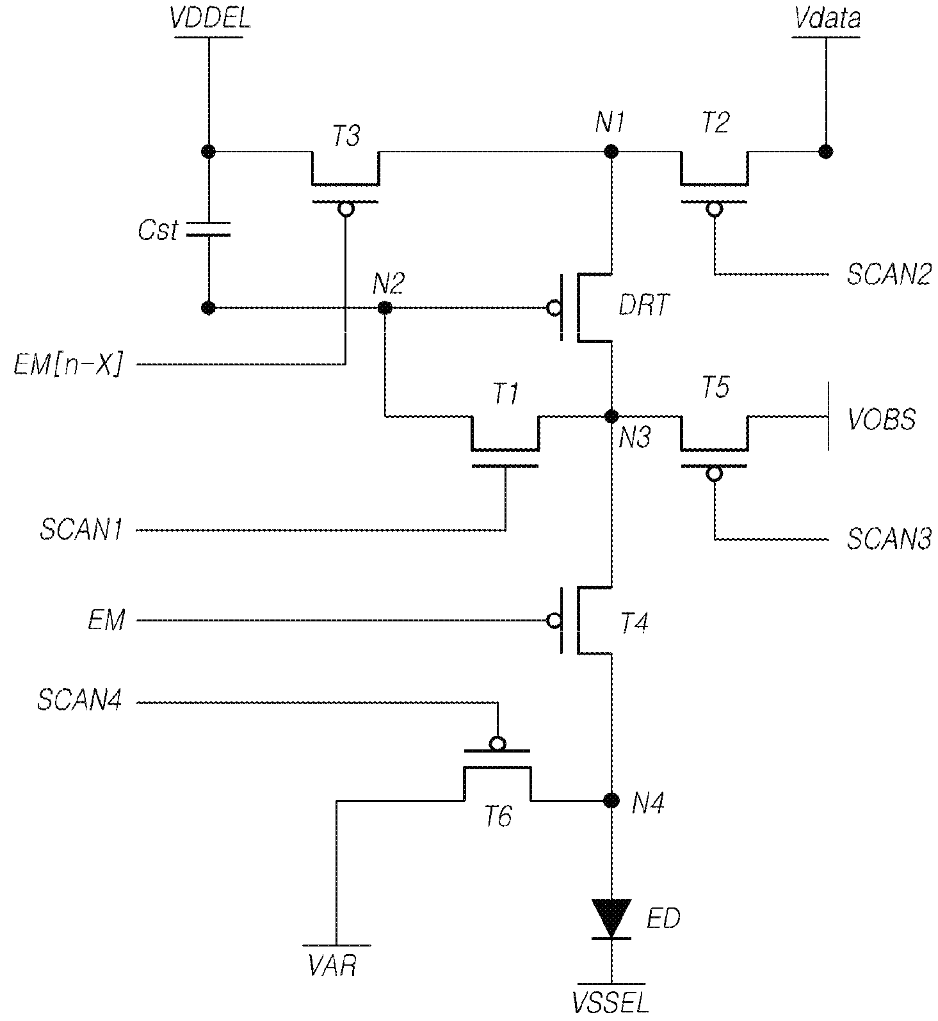
FIG. 4 is a diagram illustrating an example of a sub-pixel circuit of the display device according to one embodiment of the present disclosure.

FIG. 4 is a diagram illustrating an example of a sub-pixel circuit of the display device according to one embodiment of the present disclosure.

Referring to FIG. 4, the sub-pixel SP of the display device 100 according to one embodiment of the present disclosure includes first to sixth switching transistors T1 to T6, a driving transistor DRT, a storage capacitor Cst, and a light emitting element ED.

Here, an $n^{th}$ sub-pixel SP in which the light emitting element ED emits light by a second emission signal EM[n] will be assumed and described.

In this case, the light emitting element ED may be, for example, a self-light emitting element capable of emitting light by itself, such as an OLED.

In the sub-pixel SP according to one embodiment of the present disclosure, the second to sixth switching transistors T2 to T6 and the driving transistor DRT may be P-type transistors. In addition, the first switching transistor T1 may be an N-type transistor.

The P-type transistor is relatively more reliable than the N-type transistor. Since a drain electrode of the P-type transistor T3 is electrically connected to a high potential driving voltage VDDEL, there is an advantage in that a current flowing in the light emitting element ED does not fluctuate due to the storage capacitor Cst. Therefore, it is easy to supply a current stably.

For example, the fourth switching transistor T4 and the sixth switching transistor T6 may be connected to an anode electrode of the light emitting element ED. In this case, when the switching transistors T4 and T6 connected to the light emitting element ED operate in a saturation region, a constant current may flow regardless of changes in current and threshold voltage of the light emitting element ED so that reliability is relatively high.

In such a sub-pixel SP structure, the N-type transistor T1 may be formed as an oxide transistor formed using a semiconductive oxide (e.g., a transistor having a channel formed from a semiconductive oxide such as indium, gallium, or zinc oxide or indium gallium zinc oxide (IGZO)), and the remaining P-type transistors DRT and T2 to T6 may each be a silicon transistor formed using a semiconductor such as silicon (e.g., a transistor having a polysilicon channel formed using a low temperature process referred to as low temperature polysilicon (LTPS).

Since an oxide transistor has a relatively low leakage current compared to a silicon transistor, when a transistor is implemented using an oxide transistor, a current is prevented from leaking from the gate electrode of the driving transistor DRT so that an effect of reducing defects of an image such as flicker can be achieved.

Meanwhile, the remaining P-type transistors DRT and T2 to T6, excluding the first switching transistor T1 corresponding to the N-type transistor, may each be formed of LTPS.

A gate electrode of the first switching transistor T1 receives a first scan signal SCAN1. A drain electrode of the first switching transistor T1 is connected to the gate electrode of the driving transistor DRT through a second node N2. A source electrode of the first switching transistor T1 is connected to a source electrode of the driving transistor DRT.

The first switching transistor T1 is turned on by the first scan signal SCAN1 and controls an operation of the driving transistor DRT through the high potential driving voltage VDDEL stored in the storage capacitor Cst. The high potential driving voltage VDDEL may have a value ranging from 2 V to 3 V and may have a lower level than a bias voltage VOBS.

In order to constitute an oxide transistor, the first switching transistor T1 may be formed as an N-type metal oxide semiconductor (MOS) transistor. Since the N-type MOS transistor uses electrons as carriers instead of holes, mobility is faster than that of the P-type MOS transistor and thus a switching speed can be faster.

A gate electrode of the second switching transistor T2 receives a second scan signal SCAN2. A drain electrode of the second switching transistor T2 may receive the data voltage Vdata. A source electrode of the second switching transistor T2 is connected to a drain electrode of the driving transistor DRT through a first node N1.

The second switching transistor T2 is turned on by the second scan signal SCAN2 to supply the data voltage Vdata to the drain electrode of the driving transistor DRT.

A gate electrode of the third switching transistor T3 receives a first emission signal EM[n−X] (X is a natural number less than n) prior to the second emission signal EM[n]. A drain electrode of the third switching transistor T3 receives the high potential driving voltage VDDEL. A source electrode of the third switching transistor T3 is connected to the drain electrode of the driving transistor DRT through the first node N1.

The third switching transistor T3 is turned on by the first emission signal EM[n−X] to supply the high potential driving voltage VDDEL to the drain electrode of the driving transistor DRT.

A gate electrode of the fourth switching transistor T4 receives the second emission signal EM[n]. A drain electrode of the fourth switching transistor T4 is connected to the source electrode of the driving transistor DRT through a third node N3. A source electrode of the fourth switching transistor T4 is connected to the anode electrode of the light emitting element ED through a fourth node N4.

The fourth switching transistor T4 is turned on by the second emission signal EM[n] to supply a driving current to the anode electrode of the light emitting element ED.

In this case, since the third switching transistor T3 is turned on by the first emission signal EM[n−X] and the fourth switching transistor T4 is turned on by the second emission signal EM[n], the third switching transistor T3 is turned on a predetermined or selected time earlier than the fourth switching transistor T4.

A gate electrode of the fifth switching transistor T5 receives a third scan signal SCAN3.

A drain electrode of the fifth switching transistor T5 receives the bias voltage VOBS. The bias voltage VOBS may have a value between 5.5 V and 7 V and may have a higher level than the high potential driving voltage VDDEL. A source electrode of the fifth switching transistor T5 is connected to the source electrode of the driving transistor DRT through the third node N3.

The fifth switching transistor T5 is turned on by the third scan signal SCAN3 to supply the bias voltage VOBS to the source electrode of the driving transistor DRT.

A gate electrode of the sixth switching transistor T6 receives the fourth scan signal SCAN4.

Here, the fourth scan signal SCAN4 may be a third scan signal SCAN3 supplied to a sub-pixel SP at a different location. For example, when the third scan signal SCAN3 is applied to the $n^{th}$ gate line GL, the fourth scan signal SCAN4 may be a third scan signal SCAN3 applied to the $(n+1)^{th}$ gate line GL. That is, the fourth scan signal SCAN4 may use the third scan signal SCAN3 that changes a gate line GL according to a phase in which the display panel 110 is driven.

A drain electrode of the sixth switching transistor T6 receives a reset voltage VAR. A source electrode of the sixth switching transistor T6 is connected to the anode electrode of the light emitting element ED through the fourth node N4.

The sixth switching transistor T6 is turned on by the fourth scan signal SCAN4 to supply the reset voltage VAR to the anode electrode of the light emitting element ED.

The gate electrode of the driving transistor DRT is connected to the drain electrode of the first switching transistor T1. The drain electrode of the driving transistor DRT is connected to the source electrode of the second switching transistor T2. The source electrode of the driving transistor DRT is connected to the source electrode of the first switching transistor T1.

The driving transistor DRT is turned on by a voltage difference between the source electrode and the drain electrode of the first switching transistor T1, and accordingly, the driving current is applied to the light emitting element ED.

The high potential driving voltage VDDEL is applied to one side of the storage capacitor Cst, and the other side of the storage capacitor Cst is connected to the gate electrode of the driving transistor DRT. The storage capacitor Cst stores a voltage of the gate electrode of the driving transistor DRT.

The anode electrode of the light emitting element ED is connected to the source electrode of the fourth switching transistor T4 and the source electrode of the sixth switching transistor T6. A low potential base voltage VSSEL is applied to a cathode electrode of the light emitting element ED.

The light emitting element ED emits light with a predetermined or selected luminance by a driving current flowing through the driving transistor DRT.

In the following case, the reset voltage VAR is supplied to reset the anode electrode of the light emitting element ED.

When the reset voltage VAR is supplied to the anode electrode of the light emitting element ED in a state in which the fourth switching transistor T4, which is located between the anode electrode of the light emitting element ED and the driving transistor DRT, is turned off by the second emission signal EM[n], the anode electrode of the light emitting element ED may be reset.

In order to allow the driving operation of the driving transistor DRT and the operation of resetting the anode electrode of the light emitting element ED to be performed separately, the third scan signal SCAN3 for driving the driving transistor DRT or applying the bias voltage VOBS may have a phase different from a phase of the fourth scan signal SCAN4 for controlling the supply of the reset voltage VAR to the anode electrode of the light emitting element ED.

In this case, when the switching transistors T5 and T6 supplying the bias voltage VOBS and the reset voltage VAR respectively are turned on, the fourth switching transistor T4 connecting the source electrode of the driving transistor DRT to the anode electrode of the light emitting element ED is turned off so that the driving current of the driving transistor DRT may be prevented from flowing in the anode electrode of the light emitting element ED, and the sub-pixel SP may be configured such that the anode electrode of the light emitting element ED is not affected by voltages other than the reset voltage VAR.

As described above, the sub-pixel SP including seven transistors DRT, T1, T2, T3, T4, T5, and T6 and one capacitor Cst may be referred to as having a 7T1C structure.

Here, an example of the 7T1C structure is shown among sub-pixel SP circuits having various structures, and the structure and number of transistors and capacitors constituting the sub-pixel SP may be variously changed. Meanwhile, the plurality of sub-pixels SP may have the same structure, and some of the plurality of sub-pixels SP may have different structures.

In such a sub-pixel SP structure, by differentiating a turning-on time of the first emission signal EM[n−X] for controlling the third switching transistor T3 to supply the high potential driving voltage VDDEL to the drain electrode of the driving transistor DRT from the second emission signal in EM[n] for controlling the fourth switching transistor T4 to supply the driving current to the anode electrode of the light emitting element ED, it is possible to reduce defects in image quality such as black excitation in a time section of operation at a low driving frequency.

Figure 5:
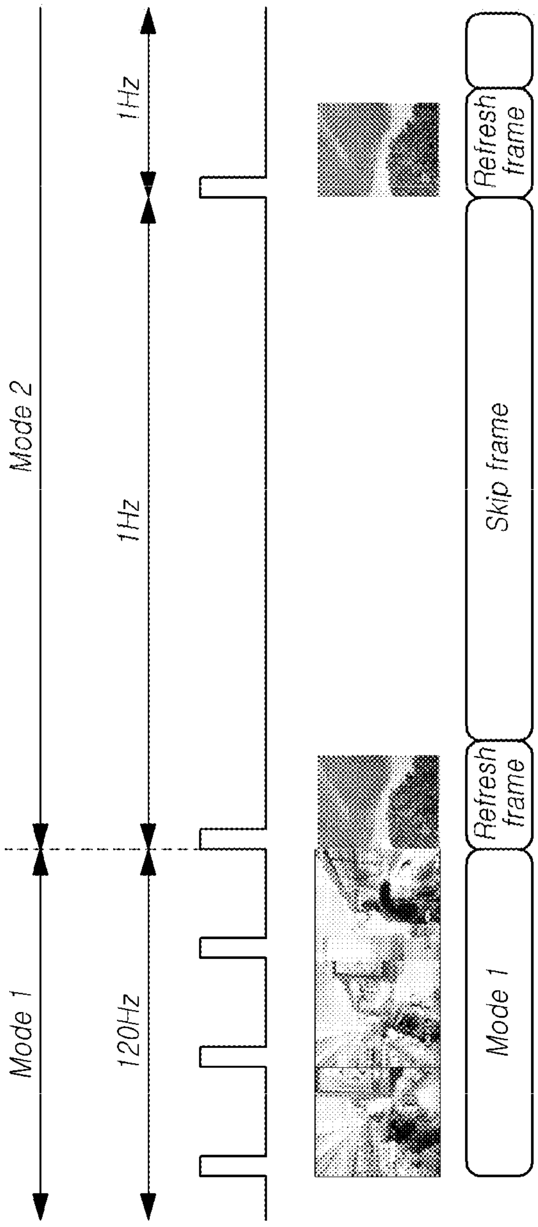
FIG. 5 is a schematic diagram illustrating a driving mode according to a frequency change in the display device according to one embodiment of the present disclosure.

FIG. 5 is a schematic diagram illustrating a driving mode according to a frequency change in the display device according to one embodiment of the present disclosure.

Referring to FIG. 5, the display device 100 according to one embodiment of the present disclosure may be operated in a mode which is divided into a first mode Mode 1 in which an image is changed and displayed at a high-speed first frequency, and a second mode Mode 2 in which a still image or a low-speed image is displayed at a low-speed second frequency.

For example, in the first mode Mode 1, image data may be displayed on the display panel 110 in full color at a frequency of 120 Hz corresponding to the first frequency. While the display device 100 is operated in the first mode Mode 1, the sub-pixel SP of the display panel 110 displays the image data DATA transmitted from the timing controller 140 120 frames per second.

As described above, a time section in which an image is continuously displayed on the display panel 110 at a high-speed driving frequency may be referred to as a refresh frame. For example, when the driving frequency is 120 Hz, all 120 frames for one second in the first mode Mode 1 may be refresh frames in which the image data DATA is displayed.

On the other hand, when the display panel 110 is operated in the second mode Mode 2 in which a still image or a low-speed image is displayed, the display device 100 may display a designated image on the display panel 110 during an initial time section of the second mode Mode 2 and may not output an image to the display panel 110 during the remaining time section of the second mode Mode 2.

For example, when the display device 100 enters the second mode Mode 2, a driving frequency may be changed from a first frequency of 120 Hz to a second frequency of 1 Hz. In this case, in the second mode Mode 2 in which the driving frequency is changed to a frequency of 1 Hz, an image displayed in the last time section of the first mode Mode 1 is displayed on the display panel 110.

For example, in the second mode Mode 2 driven at a frequency of 1 Hz, the display device 100 may display the image displayed in the last time section of the first mode Mode 1 once on the display panel 110 and may not output the image during the remaining time section.

In this case, the sub-pixel SP may display the image once in the second mode Mode 2 and may maintain the voltage stored in the storage capacitor Cst for the remaining time section.

As described above, a time section in which the voltage stored in the storage capacitor Cst is maintained without transmitting the image data to the display panel 110 may be referred to as a skip frame. For example, when the driving frequency is 120 Hz, in the second mode Mode 2, a first frame may be a refresh frame in which image data is displayed, and the remaining frames may be skip frames in which the image data is not output.

In this way, in the second mode Mode 2 of the low-speed driving, the image data DATA is not displayed for a predetermined or selected period (skip frame) so that power consumption can be reduced.

Figure 6:
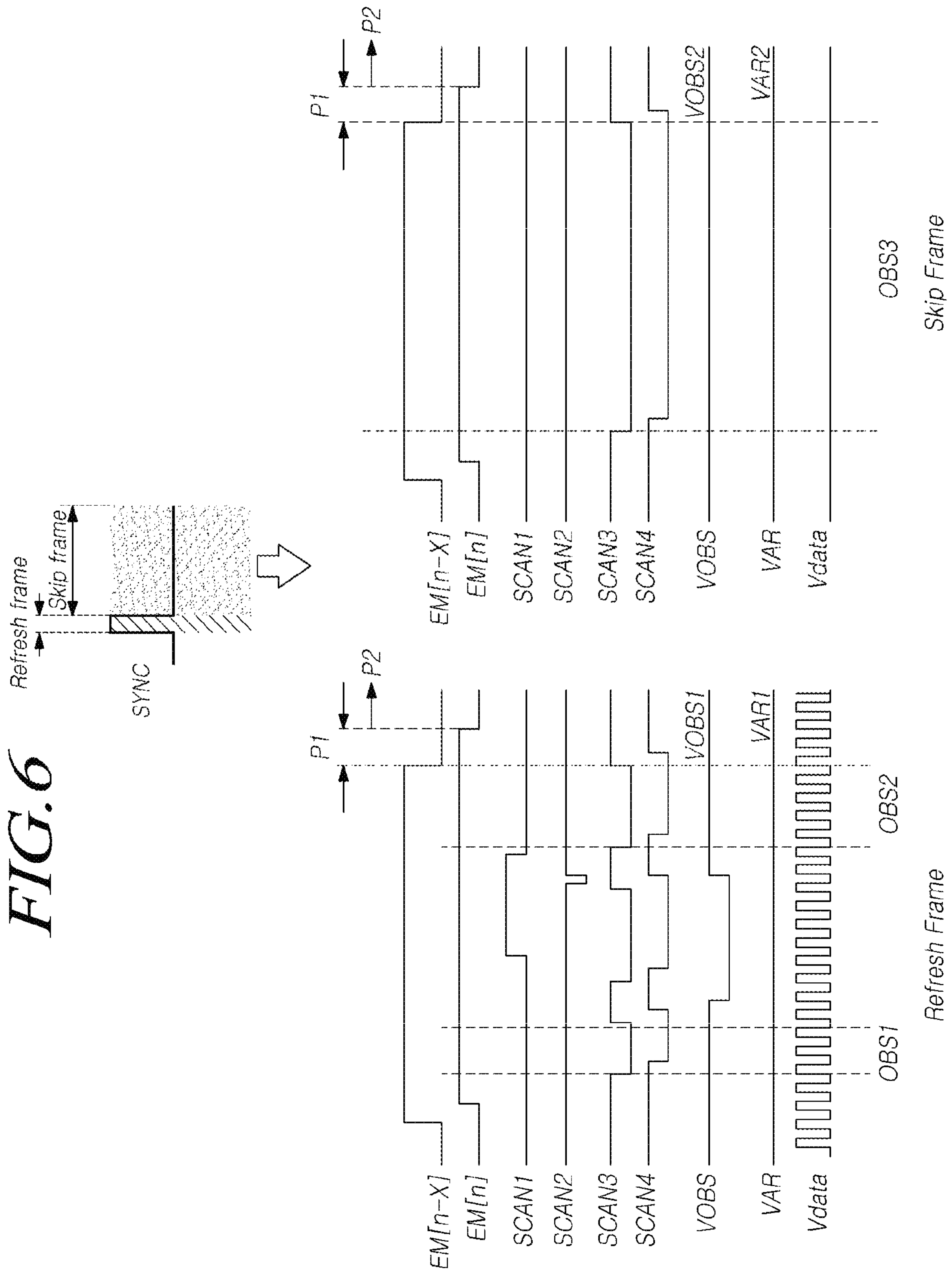
FIG. 6 is a schematic diagram illustrating a driving timing in a second mode driven at a low driving frequency in the display device according to one embodiment of the present disclosure.

FIG. 6 is a schematic diagram illustrating a driving timing in a second mode driven at a low driving frequency in the display device according to one embodiment of the present disclosure.

Referring to FIG. 6, in the display device 100 according to one embodiment of the present disclosure, in the second mode Mode 2 operating at a low driving frequency, one frame period may be divided into a first frame period and a second frame period according to a synchronization signal SYNC.

The first frame period may be the refresh frame period in which the image data DATA is displayed on the display panel 110, and the second frame period may be the skip frame period in which the image data DATA is not output to the display panel 110.

During the refresh frame, in order to drive the sub-pixel SP, a data voltage Vdata, a stabilization voltage (not shown), and a reset voltage VAR may be applied.

During the refresh frame, a voltage charged or remaining in the storage capacitor Cst may be initialized. The refresh frame may be partially provided in a start time section for each frame in the low-speed second mode Mode 2. In the refresh frame, an influence of the data voltage Vdata and the driving voltage stored in the sub-pixel SP during the high-speed first mode Mode 1 may be removed.

After a refresh operation is completed within the refresh frame, the light emitting element ED may emit light according to the data voltage Vdata applied to the sub-pixel SP.

Meanwhile, a sampling process for compensating for a characteristic value (a threshold voltage or mobility) of the driving transistor DRT may be performed in the refresh frame.

For example, when the first switching transistor T1 is turned on by the first scan signal SCAN1 and thus the gate electrode and the source electrode of the driving transistor DRT are electrically connected, the gate electrode and the source electrode of the driving transistor DRT have substantially the same potential.

In this case, when the second switching transistor T2 is turned on by the second scan signal SCAN2 and thus the data voltage Vdata is supplied, a current path is formed until a voltage difference between the gate electrode and the source electrode of the driving transistor DRT reaches a threshold voltage of the driving transistor DRT. Accordingly, voltage charging for the gate electrode and the source electrode of the driving transistor DRT are finished.

That is, when the data voltage Vdata is supplied to the drain electrode of the driving transistor DRT, the voltages of the gate electrode and the source electrode of the driving transistor DRT rise to a voltage difference between the data voltage Vdata and the threshold voltage. Therefore, the threshold voltage of the driving transistor DRT may be compensated.

As described above, the process of compensating for the characteristic value of the driving transistor DRT through the sampling process may correspond to internal compensation.

Meanwhile, in order to reduce a hysteresis effect which may occur in the driving transistor DRT and to improve a response characteristic, the bias voltage VOBS may be applied during the refresh frame.

For example, a peak white grayscale voltage may be applied to the gate electrode of the driving transistor DRT, and thus the driving transistor DRT may be in an on-bias state in which a large current flows between the drain electrode and the source electrode of the driving transistor DRT.

On the other hand, a peak black grayscale voltage is applied to the gate electrode of the driving transistor DRT, and thus the driving transistor DRT may be in an off-bias state in which a current hardly flows between the drain electrode and the source electrode of the driving transistor DRT.

The peak white grayscale voltage is a voltage applied to the gate electrode of the driving transistor DRT to allow the light emitting element ED to emit light with a peak white grayscale, and the peak black grayscale voltage is a voltage applied to the gate electrode of the driving transistor DRT to allow the light emitting element ED to emit light with a peak black grayscale. For example, when the grayscale value is expressed as an 8-bit digital value, the peak black grayscale may be "0" which is a minimum or lowest value, and the peak white grayscale may be "255" which is a maximum or highest value.

In this case, since sweep curves of the on-bias state and the off-bias state of the P-type driving transistor DRT are not the same, a difference may appear in the current flowing between the drain electrode and the source electrode of the driving transistor DRT.

In this case, due to a voltage difference between the gate electrode and the source electrode of the driving transistor DRT in the gray representation, a difference in characteristics of currents flowing between the drain electrode and the source the electrode of the driving transistor DRT that occurs in the on-bias state and the off-bias state may be referred to as a hysteresis phenomenon, and the difference may be a cause of an afterimage.

In addition, a difference in driving current flowing in the drain electrode and the source electrode of the driving transistor DRT may not stabilize the driving characteristic of the light emitting element ED and may cause a difference in luminance.

In particular, when the display device 100 is driven in the first mode Mode 1 of a high driving frequency and then switched to the second mode Mode 2 of a low driving frequency, an afterimage due to a hysteresis phenomenon may be easily recognized.

Accordingly, when the display device 100 is operated in the second mode Mode 2 at a low driving frequency, in order to minimize or reduce the visibility of the afterimage due to the hysteresis phenomenon, before an emission period is begun by the second emission signal EM[n] of a low logic level L, bias time sections OBS1 and OBS2 during which the driving transistor DRT is set to an on-bias state may be configured.

The bias time sections OBS1 and OBS2 may be configured only once in the refresh frame or may be performed twice or more.

To this end, before the emission period begins, a first bias voltage VOBS1 is applied to the source electrode of the driving transistor DRT so that the driving transistor DRT may be set to an on-bias state.

For example, during the refresh frame of the second mode Mode 2 operating at a low driving frequency, the first bias voltage VOBS1 may be applied to the source electrode of the driving transistor DRT before the emission period begins.

In this case, when the second emission signal EM[n] is converted to a low logic level in a state in which the first bias voltage VOBS1 is applied to the source electrode of the driving transistor DRT, due to a kickback phenomenon, a voltage level of the fourth node N4 corresponding to the anode electrode of the light emitting element ED may increase.

As a result, the voltage level of the anode electrode of the light emitting element ED rises above a turn-on level of the light emitting element ED and a black excitation phenomenon occurs.

In order to solve the above problem, during a first emission control period P1 having a predetermined or selected time interval prior to a point of time when the second emission signal EM[n] is converted to the low logic level L, the first emission signal EM[n−X] of a low logic level L may be applied to the third switching transistor T3. Accordingly, the first emission signal EM[n−X] and the second emission signal EM[n] sequentially turn on the third switching transistor T3 and the fourth switching transistor T4 with a time interval of the first emission control period P1.

That is, by converting the first emission signal EM[n−X] to the low logic level L during the first emission control period P1 before the second emission signal EM[n] is converted to the low logic level L, the voltage level of the source electrode of the driving transistor DRT may be lowered through the high potential driving voltage VDDEL.

In this case, after the first emission signal EM[n−X] is converted to the low logic level L, the first emission control period P1 until the second emission signal EM[n] is converted to the low logic level L may be set less than or equal to a time during which the voltage level of the anode electrode of the light emitting element ED reaches the high potential driving voltage VDDEL.

In a state in which the voltage level of the anode electrode of the light emitting element ED is lowered, the second emission signal EM[n] is converted to a low logic level L in the second emission control period P2.

Even when the fourth switching transistor T4 is turned on by the second emission signal EM[n] of the low logic level L in the second emission control period P2, since the voltage level of the source electrode of the driving transistor DRT is lowered by the high potential driving voltage VDDEL, even when the voltage level of the anode electrode of the light emitting element ED rises, the voltage level of the anode electrode thereof does not exceed the turn-on level of the light emitting element ED. As a result, it is possible to solve the black excitation phenomenon occurring when the voltage level of the anode electrode of the light emitting element ED is greater than the turn-on level of the light emitting element ED.

The skip frame is a period for charging or setting the data voltage Vdata and the driving voltage of each frame. The skip frame continues until a next refresh frame begins after the refresh frame is completed.

During the skip frame, the anode electrode of the light emitting element ED is reset to the reset voltage VAR. In this case, during the skip frame, in order to solve flicker generated as the skip frame is lengthened due to low-speed driving, the anode electrode of the light emitting element ED may be reset to a predetermined or selected voltage.

Specifically, during the skip frame, the data voltage Vdata is maintained at a low logic level L.

In addition, in order to reduce a hysteresis effect which may occur in the driving transistor DRT and improve a response characteristic, the second bias voltage VOBS2 may be applied during the skip frame.

That is, when the display device 100 is operated in the second mode Mode 2 of a low driving frequency, in order to minimize or reduce the visibility of the afterimage due to the hysteresis phenomenon, before an emission period begins with the emission signal EM of a low logic level L during a skip frame period, a bias time section OBS3 during the driving transistor DRT is set to an on-bias state may be configured.

To this end, before the emission period begins, the second bias voltage VOBS2 is applied to the source electrode of the driving transistor DRT so that the driving transistor DRT may be set to an on-bias state.

For example, during the skip frame of the second mode Mode 2 operating at a low driving frequency, the second bias voltage VOBS2 may be applied to the source electrode of the driving transistor DRT before the emission period begins.

The first scan signal SCAN1 and the third scan signal SCAN3 are each maintained at the low logic level L during the skip frame, and the second scan signal SCAN2 and the fourth scan signal SCAN4 are each maintained at a high logic level H. Accordingly, the data voltage Vdata is not supplied during the skip frame. In addition, the first and fourth switching transistors T1 and T4 are maintained in a turned-off state during the skip frame.

The third scan signal SCAN3 and the fourth scan signal SCAN4 may each have a low logic level L during a partial time section of the skip frame, and may each be maintained at a high logic level H in the remaining time section thereof.

The fifth switching transistor T5 is turned on in a time section in which the third scan signal SCAN3 has a low logic level L, and the sixth switching transistor T6 is turned on in a time section in which the fourth scan signal SCAN4 has a low logic level L.

The turned-on fifth switching transistor T5 supplies the second bias voltage VOBS2 to the source electrode of the driving transistor DRT during the skip frame, and the turned-on sixth switching transistor T6 supplies the reset voltage VAR to the anode electrode of the light emitting element ED.

During the skip frame, the second emission signal EM[n] mostly maintains a high logic level H. In a time section in which the second emission signal EM[n] has a low logic level L, the fourth switching transistor T4 is turned on.

While the second emission signal EM[n] is maintained at the high logic level H during the skip frame, the fourth switching transistor T4 is turned off. Accordingly, while the anode electrode of the light emitting element ED is reset, the current of the driving transistor DRT may be cut off.

Similarly, even during the skip frame, the voltage level of the anode electrode of the light emitting element ED rises above the turn-on level of the light emitting element ED and a black excitation phenomenon may occur.

Therefore, even during the skip frame, prior to a point of time at which the second emission signal EM[n] is converted to the low logic level L, the first emission signal EM[n−X] applied to the third switching transistor T3 is converted to a low logic level L first during the first emission control period P1 so that the voltage level of the source electrode of the driving transistor DRT may be lowered to a level of the high potential driving voltage VDDEL. As a result, it is possible to solve the black excitation phenomenon occurring when the voltage level of the anode electrode of the light emitting element ED is greater than the turn-on level of the light emitting element ED.

Operation of the sub-pixel SP in the bias time section OBS2 in which the first bias voltage VOBS1 is applied during the refresh frame, the first emission control period P1 until the second emission signal EM[n] is converted to the low logic level L after the first emission signal EM[n−X] is converted to a low logic level L, and the second emission control period P2 after the second emission signal EM[n] is converted to the low logic level L will be described below.

Figure 7:
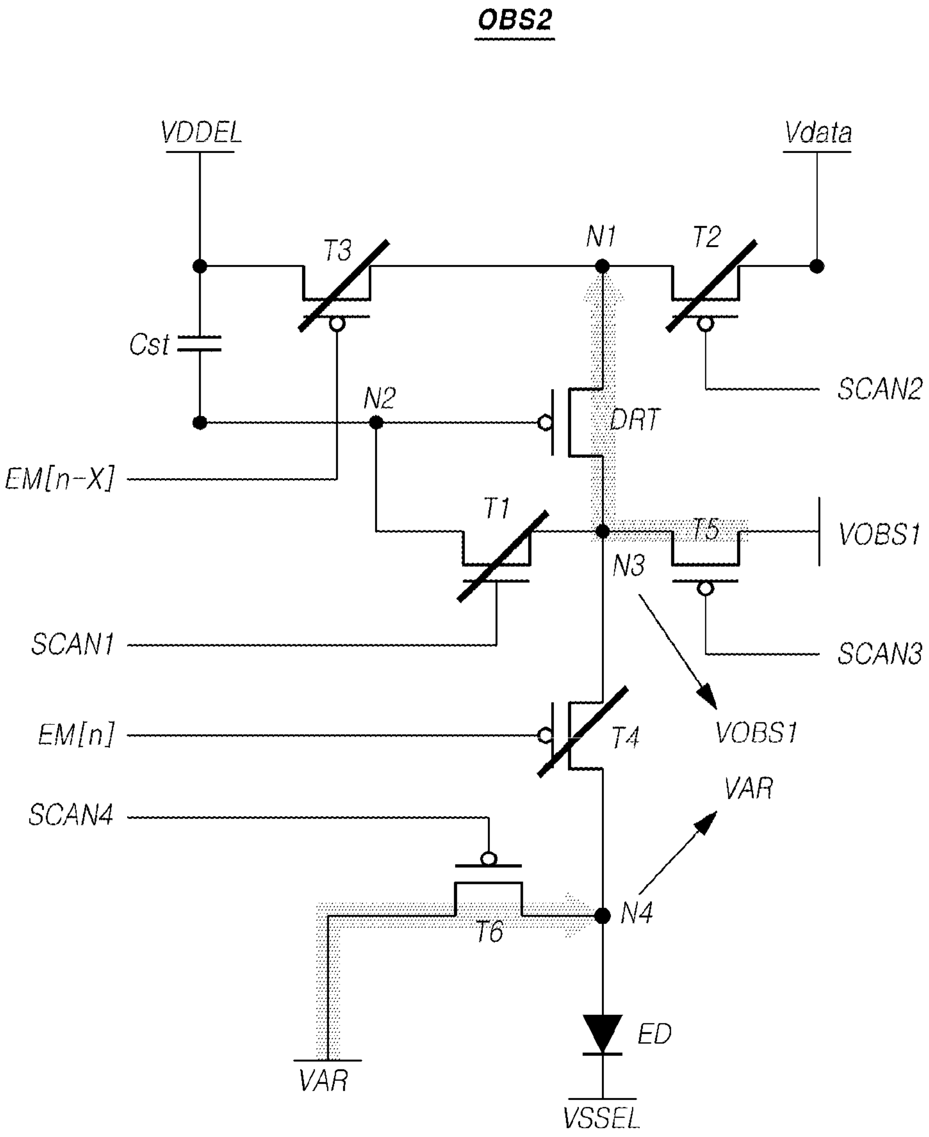
FIG. 7 is a diagram illustrating an operation of a sub-pixel in a bias time section in which a first bias voltage is applied in a refresh frame in the display device according to one embodiment of the present disclosure.

FIG. 7 is a diagram illustrating an operation of a sub-pixel in a bias time section in which a first bias voltage is applied in a refresh frame in the display device according to one embodiment of the present disclosure.

Here, the bias time sections OBS1 and OBS2 are configured twice during the refresh frame, and only the second bias time section OBS2 is shown in FIG. 7.

Referring to FIG. 7, when the display device 100 according to one embodiment of the present disclosure is operated in the second mode Mode 2 at a low driving frequency, in order to minimize or reduce the visibility of the afterimage due to the hysteresis phenomenon, before an emission period is begun by the second emission signal EM[n] of a low logic level L, the bias time section OBS2 for setting the driving transistor DRT to an on-bias state may be configured.

Since the bias time section OBS2 is configured before the first emission signal EM[n−X] and the second emission signal EM[n] are each converted to the low logic level L, the third switching transistor T3 to which the first emission signal EM[n−X] is applied and the fourth switching transistor T4 to which the second emission signal EM[n] is applied are each maintained in a turned-off state.

In addition, since the first scan signal SCAN1 is applied at the low logic level L and the second scan signal SCAN2 is applied at the high logic level H, the first switching transistor T1 and the second switching transistor T2 are each maintained in a turned-off state.

In this case, the fifth switching transistor T5 is turned on by the third scan signal SCAN3 of the low logic level L, and thus the first bias voltage VOBS1 is supplied to the source electrode of the driving transistor DRT.

As described above, the first bias voltage VOBS1 is applied to the source electrode of the driving transistor DRT so that the driving transistor DRT may be set to an on-bias state.

The first bias voltage VOBS1 may have a higher level than the high potential driving voltage VDDEL.

In this case, during the bias time section OBS2 in which the first bias voltage VOBS1 is applied to the source electrode of the driving transistor DRT, the sixth switching transistor T6 is turned on by the fourth scan signal SCAN4 of a low logic level L so that the reset voltage VAR is applied to the anode electrode of the light emitting element ED.

The reset voltage VAR may have a value ranging from −5 V to −6 V.

Since the second emission signal EM[n] is at the high logic level H during the bias time section OBS2, the fourth switching transistor T4 is maintained in the turned-off state, and the source electrode of the driving transistor DRT to which the first bias voltage VOBS1 is applied is electrically isolated from the anode electrode of the light emitting element ED.

Accordingly, during the bias time section OBS2, the source electrode of the driving transistor DRT and the anode electrode of the light emitting element ED exhibit a voltage difference corresponding to a difference (VOBS1−VAR) between the first bias voltage VOBS1 and the reset voltage VAR.

Figure 8:
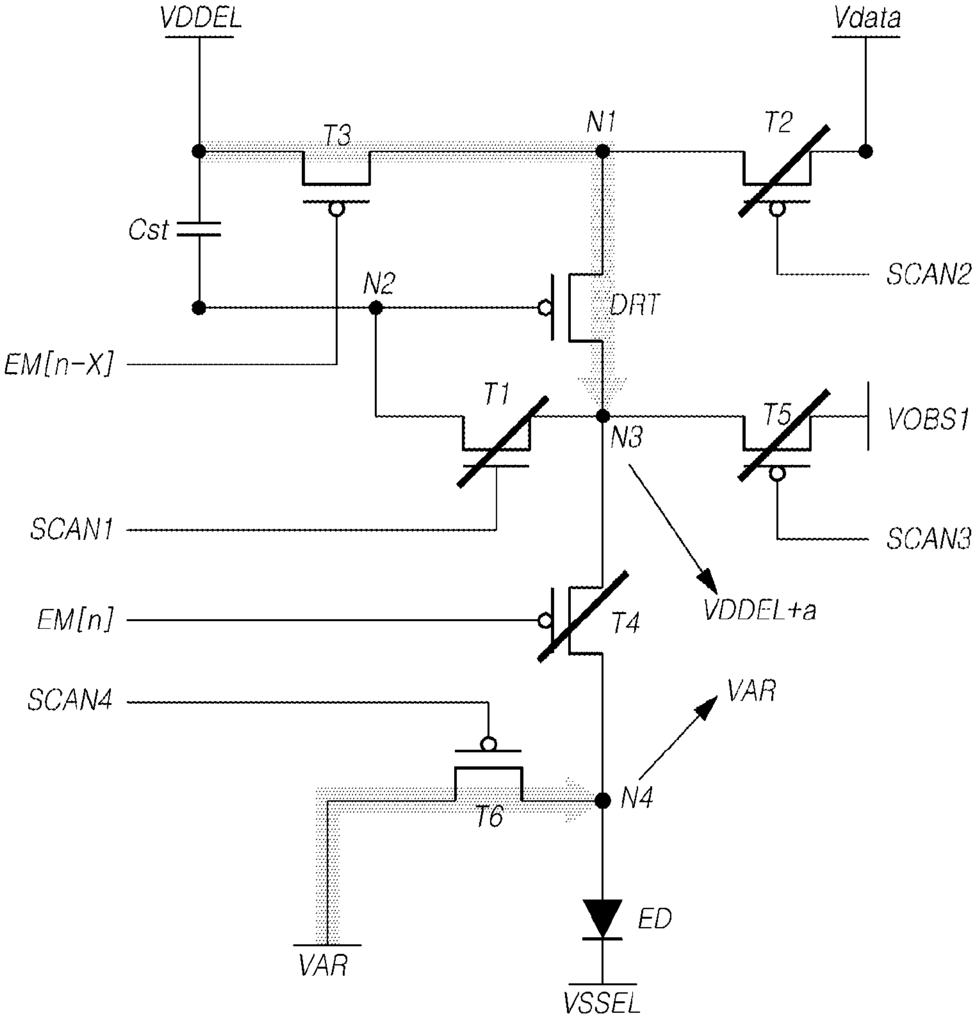
FIG. 8 is a diagram illustrating an operation of the sub-pixel in a first emission control period for controlling a source electrode of a driving transistor to a high potential level of a driving voltage within a refresh frame in the display device according to one embodiment of the present disclosure.

FIG. 8 is a diagram illustrating an operation of the sub-pixel in a first emission control period P1 for controlling a source electrode of a driving transistor to a high potential level of a driving voltage within a refresh frame in the display device according to one embodiment of the present disclosure.

Referring to FIG. 8, in the process of operating in the second mode Mode 2 of a low driving frequency, the display device 100 according to one embodiment of the present disclosure may apply the first emission signal EM[n−X], which is applied to the third switching transistor T3, at a low logic level L during the first emission control period P1 with a predetermined or selected time interval prior to a point of time at which the second emission signal EM[n] is converted to the low logic level L.

Since the third switching transistor T3 is turned on by the first emission signal EM[n−X] during the first emission control period P1, the source electrode of the driving transistor DRT is lowered from the level of the first bias voltage VOBS1 toward the level of the high potential driving voltage VDDEL. That is, the source electrode of the driving transistor DRT exhibits a voltage level (VDDEL+a) approaching the high potential driving voltage VDDEL, and the "a" in the voltage level (VDDEL+a) indicates a smaller value so that the voltage level (VDDEL+a) approaches the high potential driving voltage VDDEL.

In this case, a final voltage level of the source electrode of the driving transistor DRT may be determined according to a time interval of the first emission control period P1 in which the third switching transistor T3 is turned on by the first emission signal EM[n−X].

When the time interval of the first emission control period P1 is greater than or equal to a reference time interval, the final voltage level of the source electrode of the driving transistor DRT may become equal to the level of the high potential driving voltage VDDEL.

That is, by converting the first emission signal EM[n−X] to the low logic level L during the first emission control period P1 prior to the second emission signal EM[n], the voltage level of the source electrode of the driving transistor DRT may be lowered through the high potential driving voltage VDDEL.

In this case, during a partial or entire time of the first emission control period P1, the sixth switching transistor T6 is turned on by the fourth scan signal SCAN4 of the low logic level L so that the anode electrode of the light emitting element ED is maintained at a reset voltage VAR.

Since the second emission signal EM[n] is at the high logic level H during the first emission control period P1, the fourth switching transistor T4 is maintained in the turned-off state, and the source electrode of the driving transistor DRT to which the high potential driving voltage VDDEL is applied is electrically isolated from the anode electrode of the light emitting element ED.

Therefore, during the first emission control period P1, the source electrode of the driving transistor DRT and the anode electrode of the light emitting element ED exhibit a voltage difference corresponding to a difference (VDDEL+a−VAR) between the reset voltage VAR and a voltage level (VDDEL+a) approaching the high potential driving voltage VDDEL.

In this case, since the high potential driving voltage VDDEL has a lower level than the first bias voltage VOBS1, the voltage difference (VDDEL+a−VAR) between the source electrode of the driving transistor DRT and the anode electrode of the light emitting element ED in the first emission control period P1 has a value that is lower than the voltage difference (VOBS1−VAR) between the source electrode of the driving transistor DRT and the anode electrode of the light emitting element ED in the bias time section OBS2.

Figure 9:
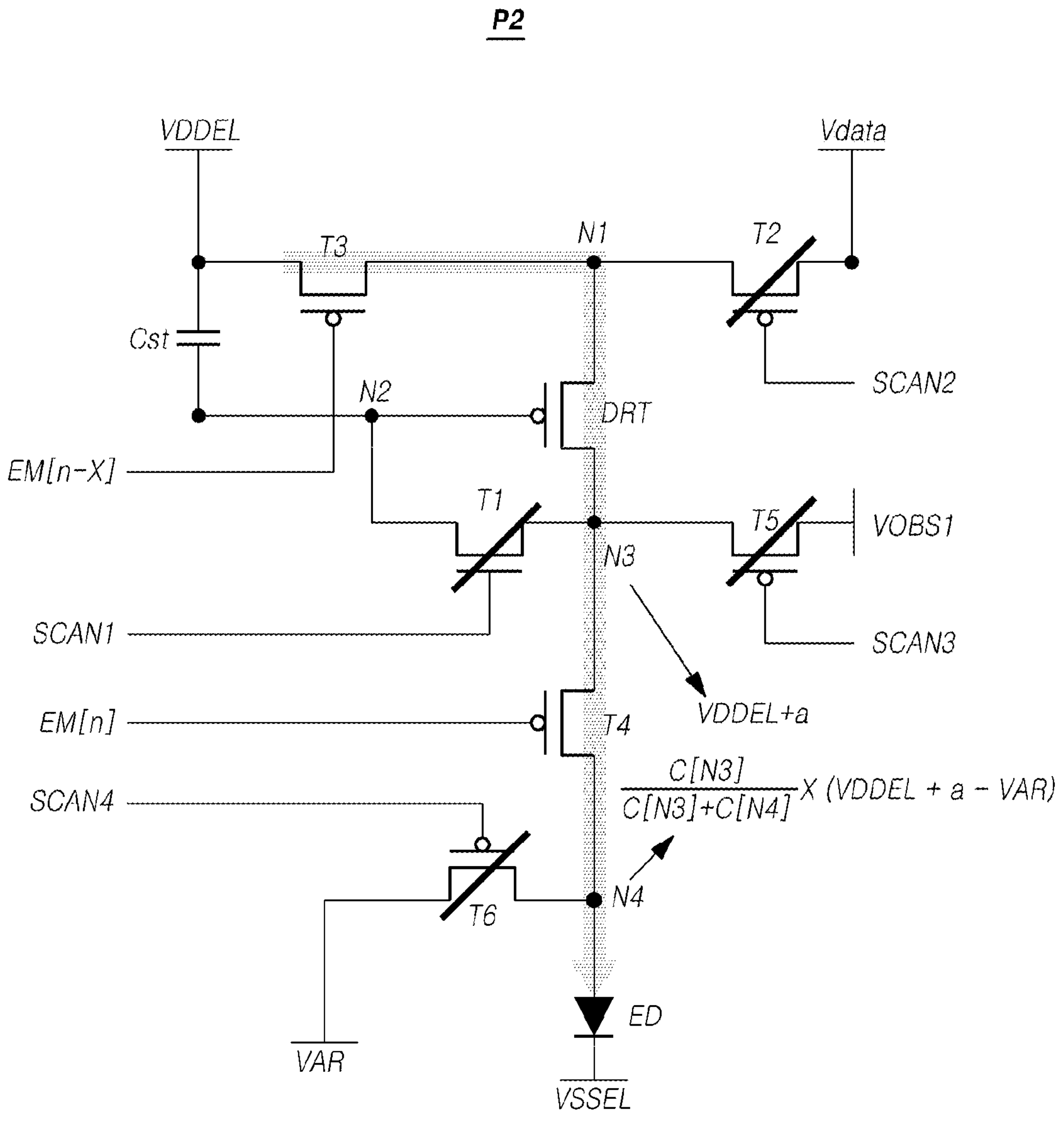
FIG. 9 is a diagram illustrating an operation of the sub-pixel in a second emission control period which supplies a driving current to a light emitting element within a refresh frame in the display device according to one embodiment of the present disclosure.

FIG. 9 is a diagram illustrating an operation of the sub-pixel in a second emission control period P2 which supplies a driving current to a light emitting element within a refresh frame in the display device according to one embodiment of the present disclosure.

Referring to FIG. 9, in the process of operating in the second mode Mode 2 at a low driving frequency, the display device 100 according to one embodiment of the present disclosure may apply the second emission signal EM[n], which is applied to the fourth switching transistor T4, at a low logic level L after the first emission control period P1 with a predetermined or selected time interval.

Since the fourth switching transistor T4 is turned on by the second emission signal EM[n] in the second emission control period P2, the source electrode of the driving transistor DRT is electrically connected to the anode electrode of the light emitting element ED.

In a state in which the sixth switching transistor T6 is turned off, a kickback voltage may be instantaneously generated at the anode electrode of the light emitting element ED, which is charged at the reset voltage VAR, due to the voltage level (VDDEL+a) of the source electrode of the driving transistor DRT.

However, since the source electrode of the driving transistor DRT is lowered to the voltage level (VDDEL+a)

approaching the high potential driving voltage VDDEL due to the first emission control period P1, the kickback voltage generated at the anode electrode of the light emitting element ED is reduced to a value proportional to the voltage difference (VDDEL+a−VAR) between the source electrode of the driving transistor DRT and the anode electrode of the light emitting element ED as follows.

$$\frac{C[N3]}{C[N3]+C[N4]}\times(VDDEL+a-VAR)$$

Here, C[N3] indicates parasitic capacitance formed at the third node N3 corresponding to the source electrode of the driving transistor DRT, and C[N4] indicates parasitic capacitance formed at the fourth node N4 corresponding to the anode electrode of the light emitting element ED.

As described above, prior to a point of time at which the second emission signal EM[n] is converted to the low logic level L, the first emission signal EM[n−X] applied to the third switching transistor T3 is converted to a low logic level L first during the first emission control period P1 so that the voltage level of the source electrode of the driving transistor DRT may be lowered to the voltage level (VDDEL+a) approaching the high potential driving voltage VDDEL. As a result, it is possible to solve the black excitation phenomenon that occurs when the voltage level of the anode electrode of the light emitting element ED becomes higher than the turn-on level of the light emitting element ED in a time section in which the voltage level of the second emission signal EM[n] is changed.

Figure 10:
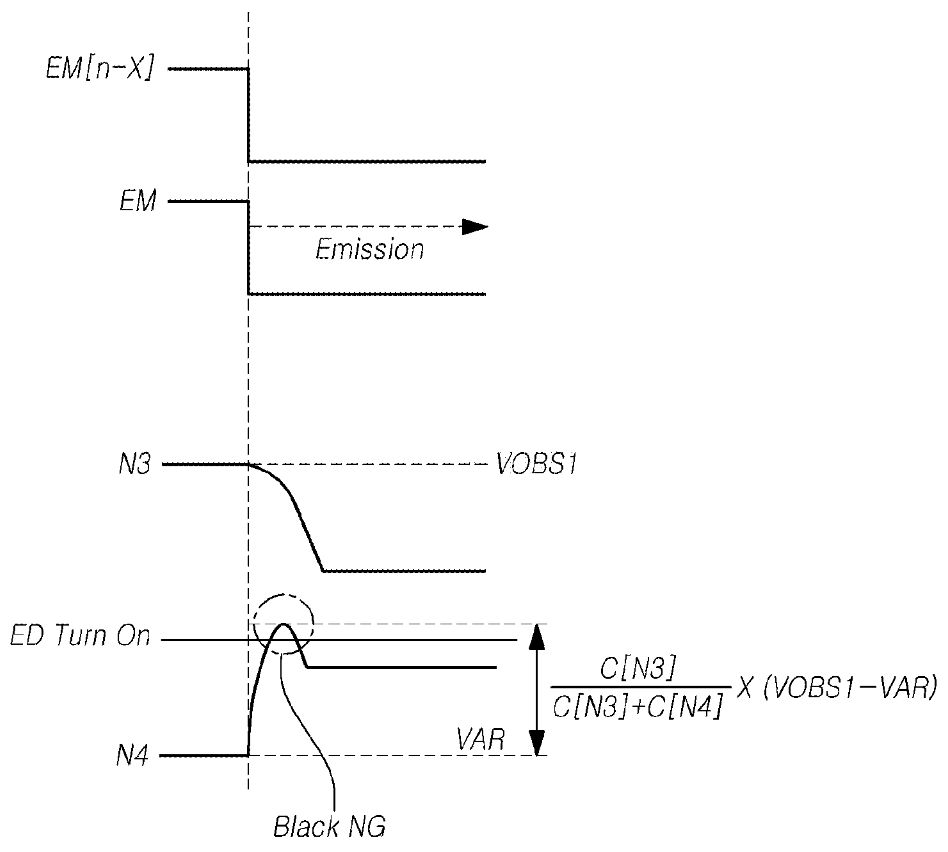
FIG. 10 is a signal waveform diagram illustrating a voltage change of an anode electrode of a light emitting element when levels of a first emission signal and a second emission signal are simultaneously converted.
Figure 11:
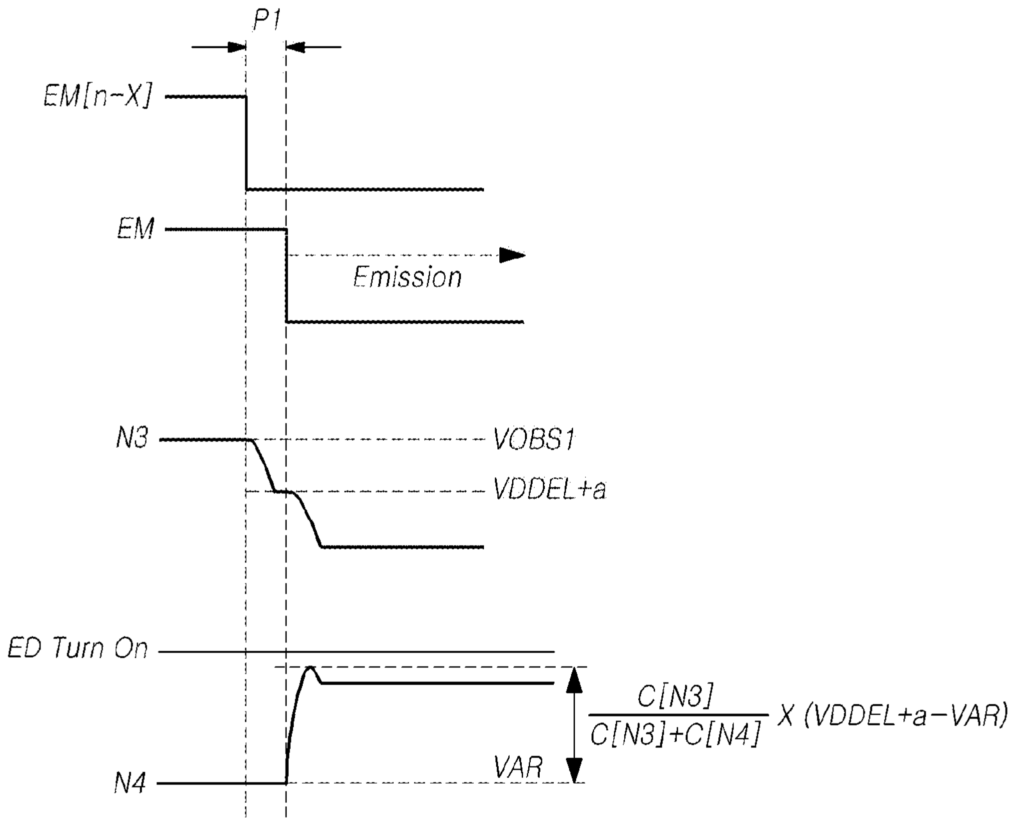
FIG. 11 is a signal waveform diagram illustrating the voltage change of the anode electrode of the light emitting element when the first emission signal is converted prior to the second emission signal in the display device according to one embodiment of the present disclosure.

FIG. 10 is a signal waveform diagram illustrating a voltage change of an anode electrode of a light emitting element when levels of a first emission signal and a second emission signal are simultaneously converted, and FIG. 11 is a signal waveform diagram illustrating the voltage change of the anode electrode of the light emitting element when the first emission signal is converted prior to the second emission signal in the display device according to one embodiment of the present disclosure.

First, referring to FIG. 10, in order to reduce the hysteresis of the driving transistor DRT during the refresh frame in which the data voltage Vdata is applied to the display panel 110 in the process of operating in the second mode Mode 2 of a low driving frequency, the first bias voltage VOBS1 is applied to the source electrode of the driving transistor DRT so that the driving transistor DRT may be set to an on-bias state.

In this case, the first bias voltage VOBS1 applied to the source electrode of the driving transistor DRT may have a higher level than the high potential driving voltage VDDEL.

During the bias time section OBS in which the first bias voltage VOBS1 is applied to the source electrode of the driving transistor DRT, the sixth switching transistor T6 is turned on by the fourth scan signal SCAN4 of a low logic level L so that the reset voltage VAR is applied to the anode electrode of the light emitting element ED.

The reset voltage VAR may have a value ranging from −5 V to −6 V.

Accordingly, in the bias time section OBS, the source electrode of the driving transistor DRT is maintained at the level of the first bias voltage VOBS1, and the anode electrode of the light emitting element ED is maintained at the level of the reset voltage VAR so that the source electrode of the driving transistor DRT and the anode electrode of the light emitting element ED exhibit a voltage difference corresponding to the difference (VOBS1−VAR) between the first bias voltage VOBS1 and the reset voltage VAR.

In the above state, when the third switching transistor T3 and the fourth switching transistor T4 are simultaneously turned on by the first emission signal EM[n−X] and the second emission signal EM[n], due to the voltage difference (VOBS1−VAR) between the source electrode of the driving transistor DRT and the anode electrode of the light emitting element ED, a high level kickback voltage may be generated at the anode electrode of the light emitting element ED as follows.

$$\frac{C[N3]}{C[N3]+C[N4]}\times(VOBS1-VAR)$$

Here, C[N3] indicates parasitic capacitance formed at the third node N3 corresponding to the source electrode of the driving transistor DRT, and C[N4] indicates parasitic capacitance formed at the fourth node N4 corresponding to the anode electrode of the light emitting element ED.

As a result, the voltage level of the anode electrode of the light emitting element ED rises above a turn-on level of the light emitting element ED and a black excitation phenomenon may occur.

In contrast, prior to a point of time at which the second emission signal EM[n] is converted to the low logic level L, the display device 100 of the present disclosure converts the first emission signal EM[n−X] first, which is applied to the third switching transistor T3, to the low logic level L during the first emission control period P1 so that the voltage level of the source electrode of the driving transistor DRT is lowered to the level of the high potential driving voltage VDDEL, thereby solving the black excitation phenomenon.

Referring to FIG. 11, in order to turn on the fourth switching transistor T4, the display device 100 according to one embodiment of the present disclosure may apply the first emission signal EM[n−X] at the low logic level L to turn on the third switching transistor T3 during the first emission control period P1 prior to a point of time at which the second emission signal EM[n] is converted to the low logic level L.

Since the third switching transistor T3 is turned on first by the first emission signal EM[n−X] during the first emission control period P1, the source electrode of the driving transistor DRT is lowered from the level of the first bias voltage VOBS1 toward the level of the high potential driving voltage VDDEL. That is, the source electrode of the driving transistor DRT exhibits a voltage level (VDDEL+a) approaching the high potential driving voltage VDDEL.

That is, by converting the first emission signal EM[n−X] to the low logic level L during the first emission control period P1 prior to the second emission signal EM[n], the voltage level of the source electrode of the driving transistor DRT may be lowered through the high potential driving voltage VDDEL.

In this case, during the first emission control period P1, the sixth switching transistor T6 is turned on by the fourth scan signal SCAN4 of the low logic level L so that the anode electrode of the light emitting element ED is maintained at a reset voltage VAR.

Therefore, during the first emission control period P1, the source electrode of the driving transistor DRT and the anode electrode of the light emitting element ED exhibit a voltage difference corresponding to a difference (VDDEL+a−VAR)

between the reset voltage VAR and a voltage level (VDDEL+a) approaching the high potential driving voltage VDDEL.

In this case, since the high potential driving voltage VDDEL has a lower level than the first bias voltage VOBS1, the voltage difference (VDDEL+a−VAR) between the source electrode of the driving transistor DRT and the anode electrode of the light emitting element ED in the first emission control period P1 has a value that is lower than the voltage difference (VOBS1−VAR) between the source electrode of the driving transistor DRT and the anode electrode of the light emitting element ED in the bias time section OBS2.

Since the source electrode of the driving transistor DRT is lowered to the voltage level (VDDEL+a) approaching the high potential driving voltage VDDEL due to the first emission control period P1, the kickback voltage generated at the anode electrode of the light emitting element ED is reduced to a value proportional to the voltage difference (VDDEL+a−VAR) between the source electrode of the driving transistor DRT and the anode electrode of the light emitting element ED as follows.

$$\frac{C[N3]}{C[N3]+C[N4]}\times(VDDEL+a-VAR)$$

Eventually, prior to a point of time at which the second emission signal EM[n] is converted to the low logic level L, the first emission signal EM[n−X] applied to the third switching transistor T3 is converted to a low logic level L first during the first emission control period P1 so that the voltage level of the source electrode of the driving transistor DRT may be lowered to the voltage level (VDDEL+a) approaching the high potential driving voltage VDDEL. As a result, it is possible to solve the black excitation phenomenon that occurs when the voltage level of the anode electrode of the light emitting element ED becomes higher than the turn-on level of the light emitting element ED in a time section in which the voltage level of the second emission signal EM[n] is changed.

Figure 12:
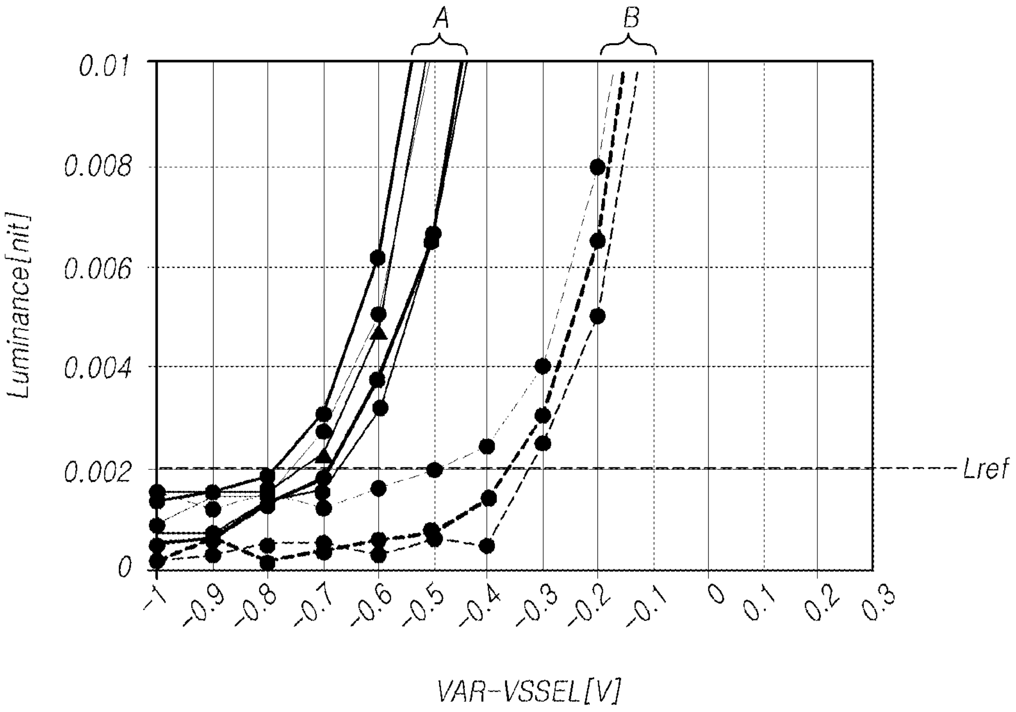
FIG. 12 is a graph illustrating a change in luminance due to a reset voltage according to driving timings of the first emission signal and the second emission signal in the display device according to one embodiment of the present disclosure.

FIG. 12 is a graph illustrating a change in luminance due to a reset voltage according to driving timings of the first emission signal and the second emission signal in the display device according to one embodiment of the present disclosure.

Referring to FIG. 12, in the display device 100 according to one embodiment of the present disclosure, in case A in which the first emission signal EM[n−X] and the second emission signal EM[n] are each simultaneously converted to the low logic level L, and thus the third switching transistor T3 and the fourth switching transistor T4 are simultaneously turned on, it can be seen that a reference luminance $L_{ref}$ for a black grayscale can be maintained only when the difference between the reset voltage VAR and the low-potential driving voltage VSSEL should be less than or equal to about −0.7 V.

On the other hand, in case B in which the first emission signal EM[n−X] is converted to the low logic level L prior to the second emission signal EM[n], and thus the third switching transistor T3 is turned on prior to the fourth switching transistor T4, it can be seen that the reference luminance Lref for the black grayscale can be maintained even when the difference between the reset voltage VAR and the low potential driving voltage VSSEL is less than or equal to about −0.4 V.

That is, prior to a point of time at which the second emission signal EM[n] is converted to the low logic level L, the first emission signal EM[n−X] applied to the third switching transistor T3 is converted to a low logic level L first during the first emission control period P1 so that the voltage level of the source electrode of the driving transistor DRT may be lowered. As a result, it is possible to reduce the black excitation phenomenon that occurs when the voltage level of the anode electrode of the light emitting element ED becomes higher than the turn-on level of the light emitting element ED in a time section in which the voltage level of the second emission signal EM[n] is changed and the reset voltage VAR can be stably maintained.

The process of converting the first emission signal EM[n−X] applied to the third switching transistor T3 to the low logic level L during the first emission control period P1 prior to a point of time at which the second emission signal EM[n] is converted to the low logic level L may be equally applied not only to the refresh frame in which the data voltage Vdata is applied to the display panel 110 but also to the skip frame in which the data voltage Vdata is not applied to the display panel 110.

Figure 13:
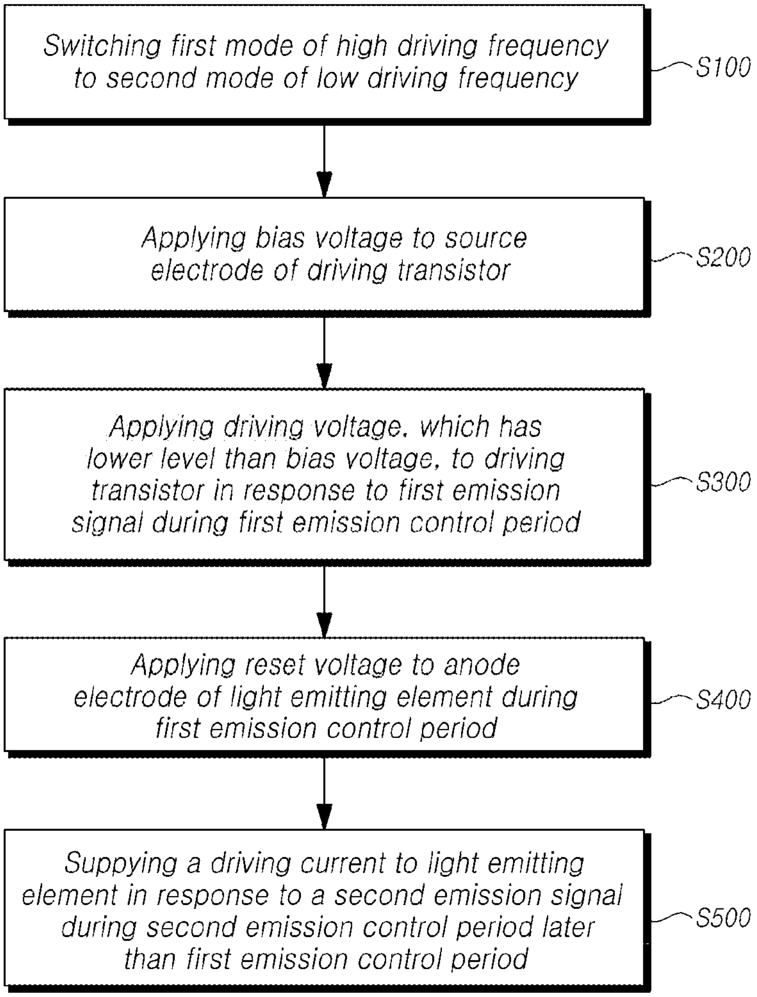
FIG. 13 is a flowchart illustrating a display driving method according to one embodiment of the present disclosure.

FIG. 13 is a flowchart illustrating a display driving method according to one embodiment of the present disclosure.

Referring to FIG. 13, a display driving method according to one embodiment of the present disclosure may include a step S100 of switching a first mode Mode 1 of a high driving frequency to a second mode Mode 2 of a low driving frequency, a step S200 of applying a bias voltage VOBS to a source electrode of a driving transistor DRT, a step S300 of applying a driving voltage VDDEL, which has a lower level than the bias voltage VOBS, to the driving transistor DRT by a first emission signal EM[n−X] during a first emission control period P1, a step S400 of applying a reset voltage VAR to an anode electrode of a light emitting element ED during the first emission control period P1, and a step S500 of supplying a driving current to the light emitting element ED by a second emission signal EM[n] during a second emission control period P2 later than the first emission control period P1.

The step S100 of switching the first mode Mode 1 at a high driving frequency to the second mode Mode 2 at a low driving frequency is a process of displaying a still image or a low-speed image and may display a designated image on a display panel 110 during a refresh frame period in the second mode and may not output an image to the display panel 110 during the remaining skip frame period.

The step S200 of applying the bias voltage VOBS to the source electrode of the driving transistor DRT is a process of setting the driving transistor DRT to an on-bias state before the light emitting element ED emits light to minimize or reduce visibility of an afterimage due to a hysteresis phenomenon when the display device 100 is operated in the second mode Mode 2 of a low driving frequency.

The process of setting the driving transistor DRT to the on-bias state may be performed in a refresh frame or a skip frame only once or two or more times.

The step S300 of applying the driving voltage VDDEL, which has the lower level than the bias voltage VOBS, to the driving transistor DRT by the first emission signal EM[n−X] during the first emission control period P1 is a process of lowering the voltage level of the source electrode of the driving transistor DRT to the level of the driving voltage VDDEL by the first emission signal EM[n−X] before the driving current is applied to the light emitting element ED by the second emission signal EM[n].

The step S400 of applying the reset voltage VAR to the anode electrode of the light emitting element ED during the first emission control period P1 is a process of resetting the anode electrode of the light emitting element ED.

The step S500 of supplying the driving current to the light emitting element ED by the second emission signal EM[n] during the second emission control period P2 later than the first emission control period P1 is a process of electrically connecting the driving transistor DRT to the light emitting element ED by the second emission signal Em[n], thereby allowing the light emitting element ED to emit light.

Through the display driving process, the display device 100 of the present disclosure may lower the voltage level of the source electrode of the driving transistor DRT from the level of the bias voltage VOBS to the level of the driving voltage VDDEL. Thus, it is possible to reduce the black excitation phenomenon that occurs when the voltage level of the black grayscale becomes higher than the turn-on level of the light emitting element ED at a point of time at which the driving current is applied to the light emitting element ED, and the reset voltage VAR can be stably maintained.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the features of the present disclosure described herein. Therefore, the embodiments disclosed in the present disclosure are intended to illustrate the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display panel, comprising:

a light emitting element;

a driving transistor configured to provide a driving current to the light emitting element based on a driving voltage;

a second switching transistor connecting the driving transistor and a data line;

a third switching transistor connecting the driving transistor and a driving voltage line;

a fourth switching transistor connecting the driving transistor and the light emitting element;

a fifth switching transistor connecting the driving transistor and a bias voltage line;

wherein, when a driving frequency switches from a first driving frequency to a second driving frequency lower than the first driving frequency, the driving transistor is configured to receive a bias voltage during a first period and the driving voltage during a second period subsequent to the first period before an emission period begins, and wherein the bias voltage is greater than the driving voltage.

2. The display panel of claim 1, wherein, the light emitting element is configured to emit light during the emission period after the second period.

3. The display panel of claim 2, wherein:

the emission period is a time section in which the fourth switching transistor is turned on during a state in which the third switching transistor is turned on.

4. The display panel of claim 1, wherein:

the second period is a time section in which the third switching transistor is turned on during a state in which the fourth switching transistor is turned off.

5. The display panel of claim 1, further comprising:

a first switching transistor connecting a gate electrode of the driving transistor and the fourth switching transistor; and a sixth switching transistor connecting the light emitting element and a reset voltage line.

6. The display panel of claim 5, wherein the first switching transistor having a gate electrode to which a first scan signal is applied, a drain electrode connected to a gate electrode of the driving transistor, and a source electrode connected to a source electrode of the driving transistor.

7. The display panel of claim 5, wherein the sixth switching transistor having a gate electrode to which a fourth scan signal is applied, a drain electrode to which a reset voltage is supplied, and a source electrode connected to the light emitting element.

8. The display panel of claim 1, wherein the second switching transistor having a gate electrode to which a second scan signal is applied, a drain electrode to which a data voltage is applied, and a source electrode connected to a drain electrode of the driving transistor.

9. The display panel of claim 1, wherein the third switching transistor having a gate electrode to which a first emission signal is applied, a drain electrode to which the driving voltage is applied, and a source electrode connected to the drain electrode of the driving transistor.

10. The display panel of claim 1, wherein the fourth switching transistor having a gate electrode to which a second emission signal is applied, a drain electrode connected to a source electrode of the driving transistor, and a source electrode connected to the light emitting element.

11. The display panel of claim 1, wherein the fifth switching transistor having a gate electrode to which a third scan signal is applied, a drain electrode to which the bias voltage is supplied.

12. The display panel of claim 1, in a mode in which the display panel is operated at the second driving frequency, wherein the mode includes:

a refresh frame period in which a data voltage for driving the light emitting element is applied; and a skip frame period in which the data voltage is not applied.

13. A display device, comprising:

a display panel including:

a light emitting element; and a driving transistor configured to provide a driving current to the light emitting element based on a driving voltage;

a plurality of emission signal lines;

an emission driving circuit configured to supply a plurality of emission signals to the display panel through the plurality of emission signal lines; and wherein, when a driving frequency switches from a first driving frequency to a second driving frequency lower than the first driving frequency, the driving transistor is configured to receive a bias voltage during a first period, and the driving voltage during a second period subsequent to the first period before an emission period begins, and wherein the bias voltage is greater than the driving voltage.

14. The display device of claim 13, wherein, the light emitting element emits light during the emission period after the second period.

15. The display device of claim 13, in a mode in which the display panel is operated at a low the second driving frequency, wherein the mode includes:

a refresh frame period in which a data voltage for driving the light emitting element is applied; and a skip frame period in which the data voltage is not applied.

* * * * *